June 1, 1965  J. R. VICKERY, JR  3,186,077
APPARATUS FOR WIRING PANELBOARDS
Filed July 9, 1963  17 Sheets-Sheet 1

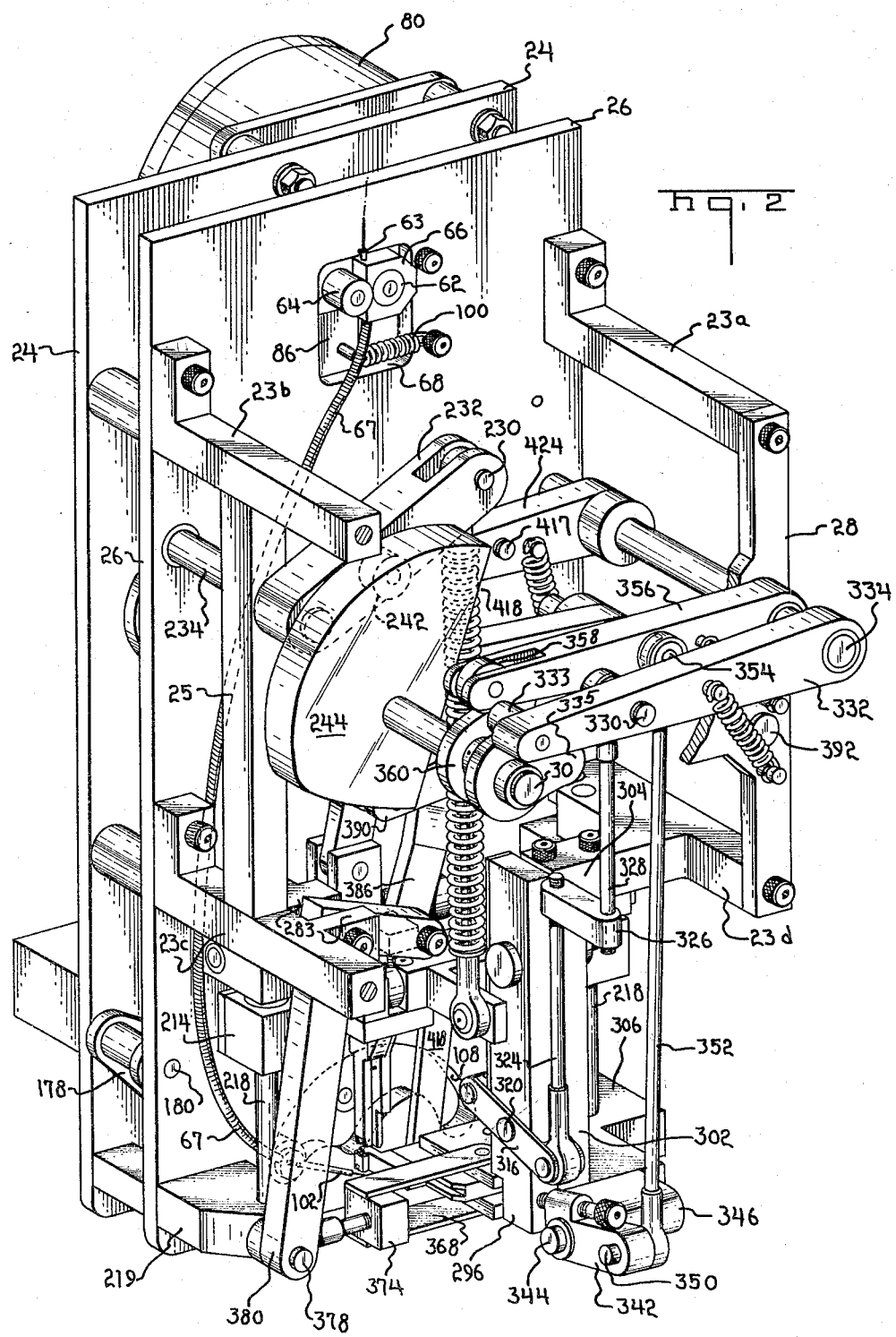

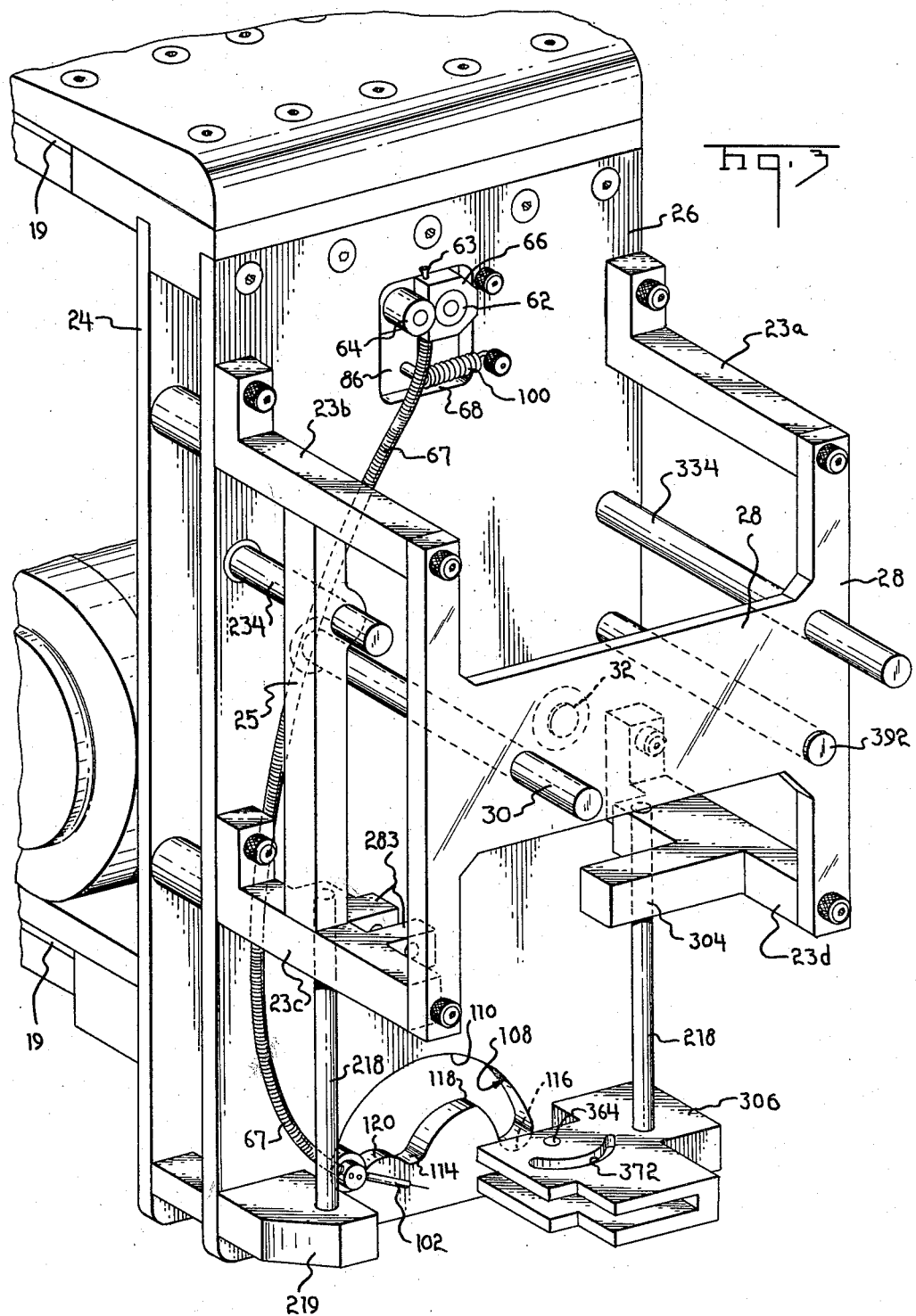

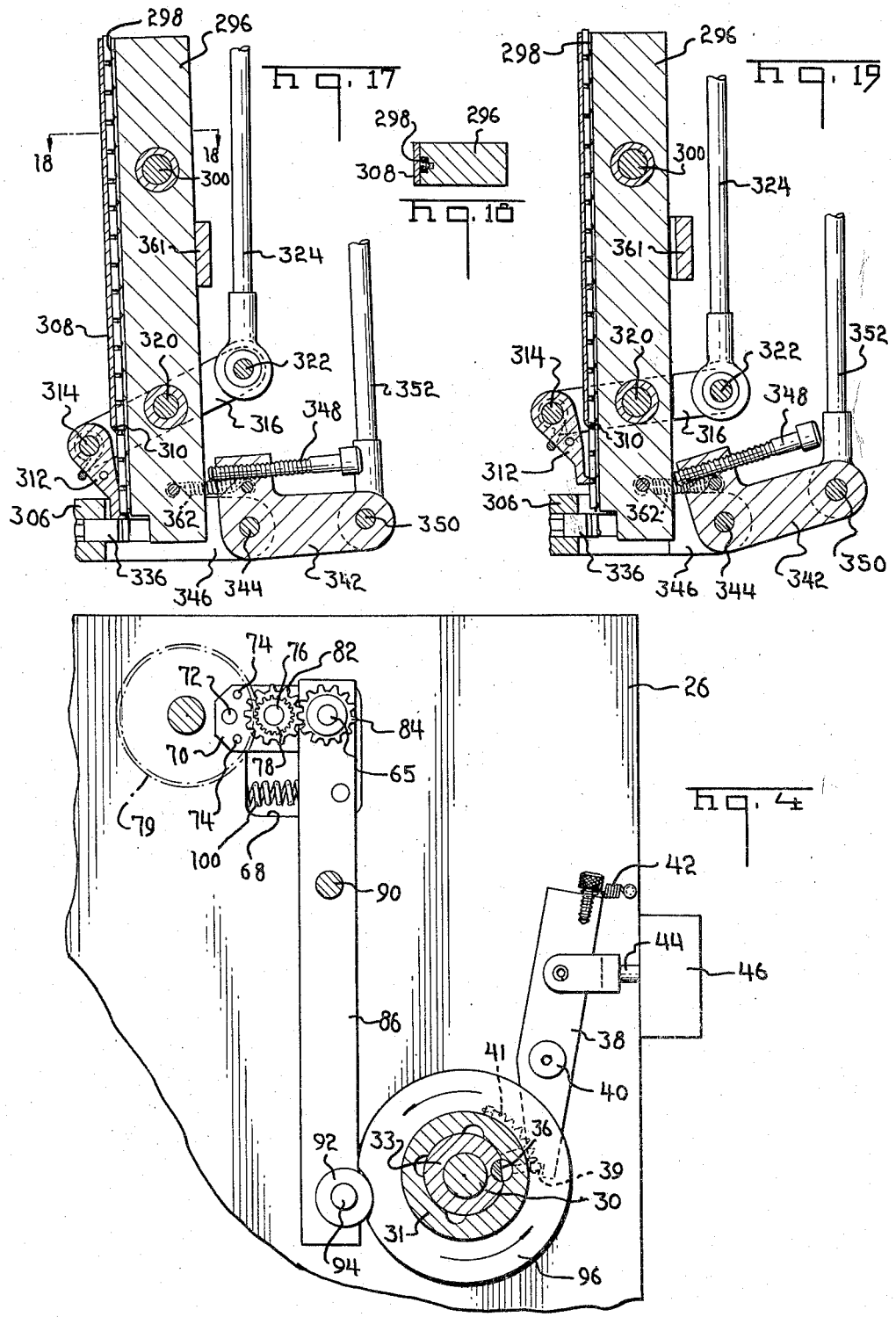

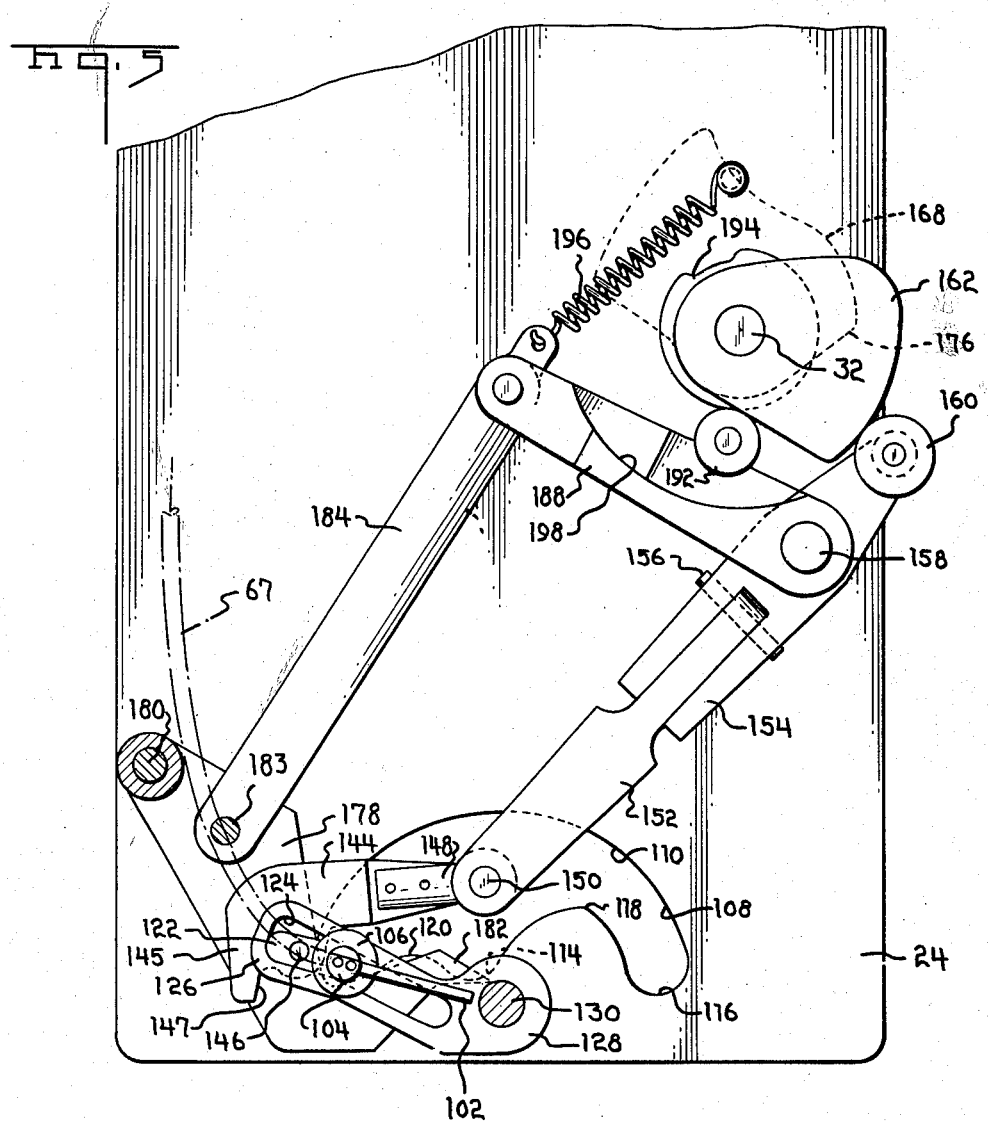

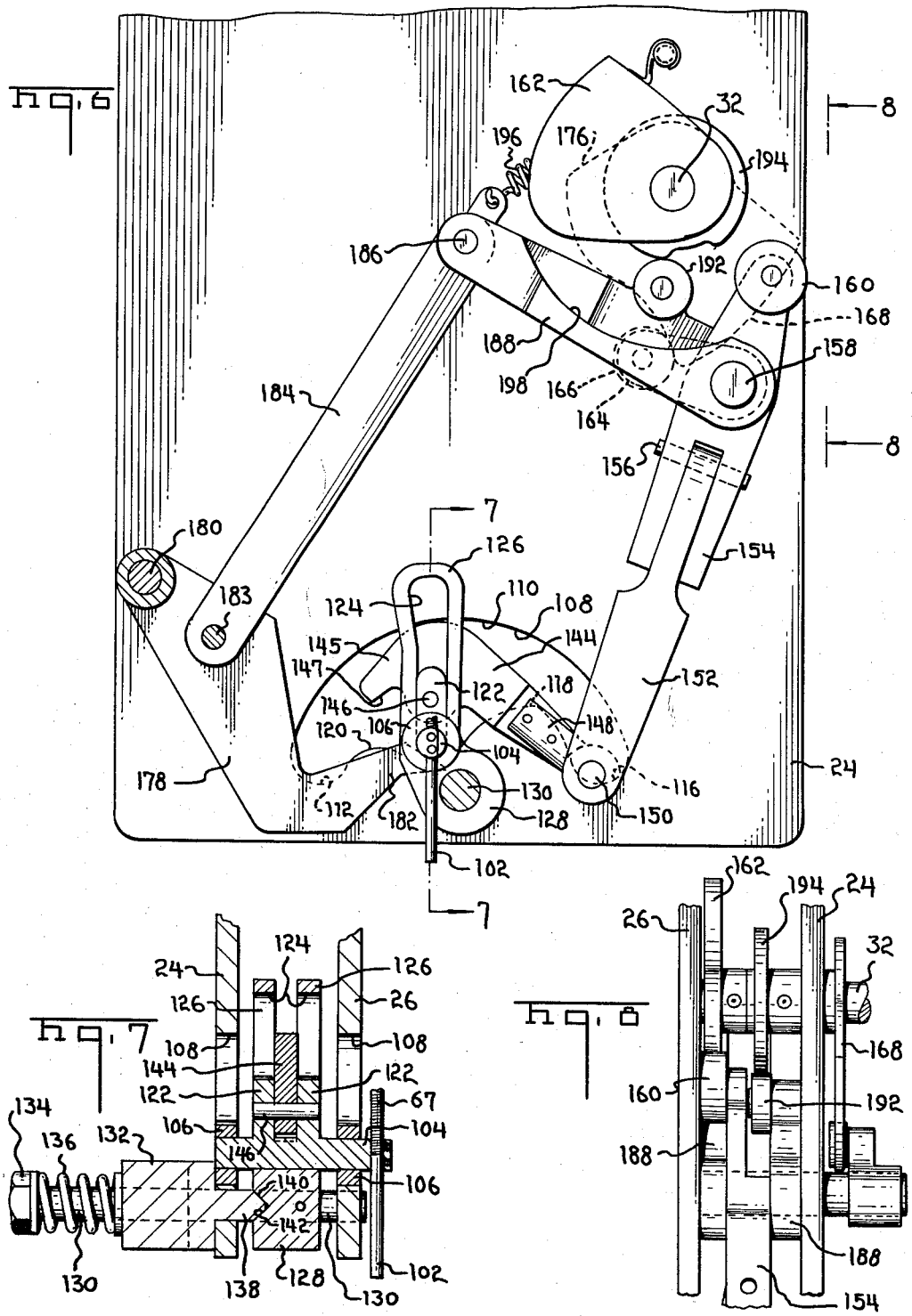

June 1, 1965  J. R. VICKERY, JR  3,186,077
APPARATUS FOR WIRING PANELBOARDS
Filed July 9, 1963  17 Sheets-Sheet 7
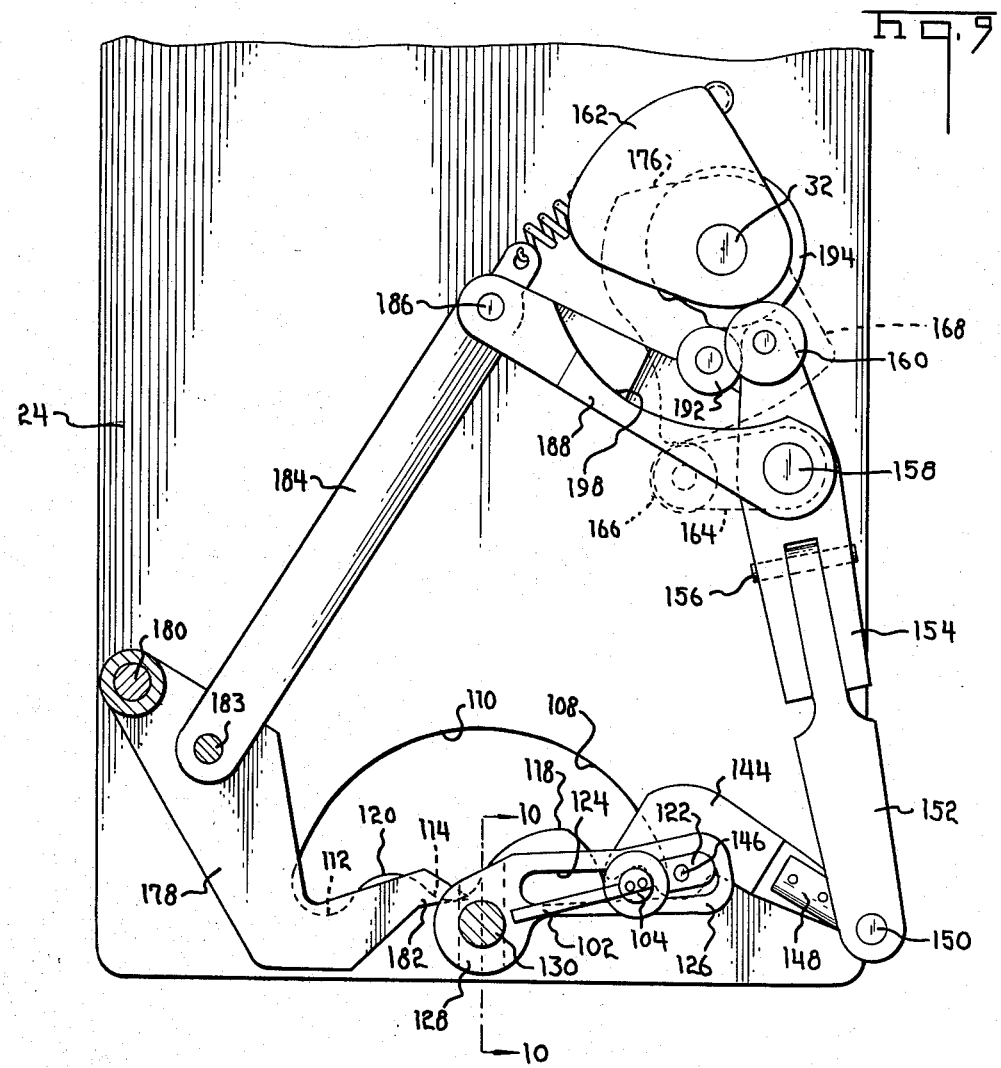
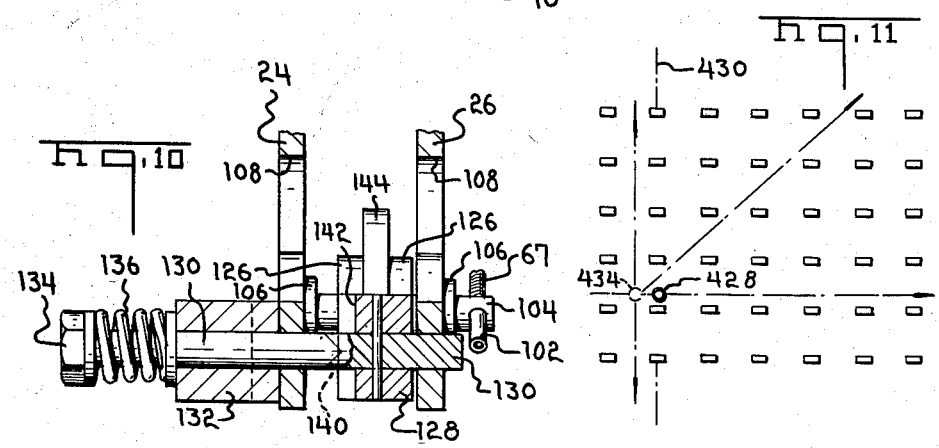

June 1, 1965   J. R. VICKERY, JR   3,186,077
APPARATUS FOR WIRING PANELBOARDS
Filed July 9, 1963   17 Sheets-Sheet 8
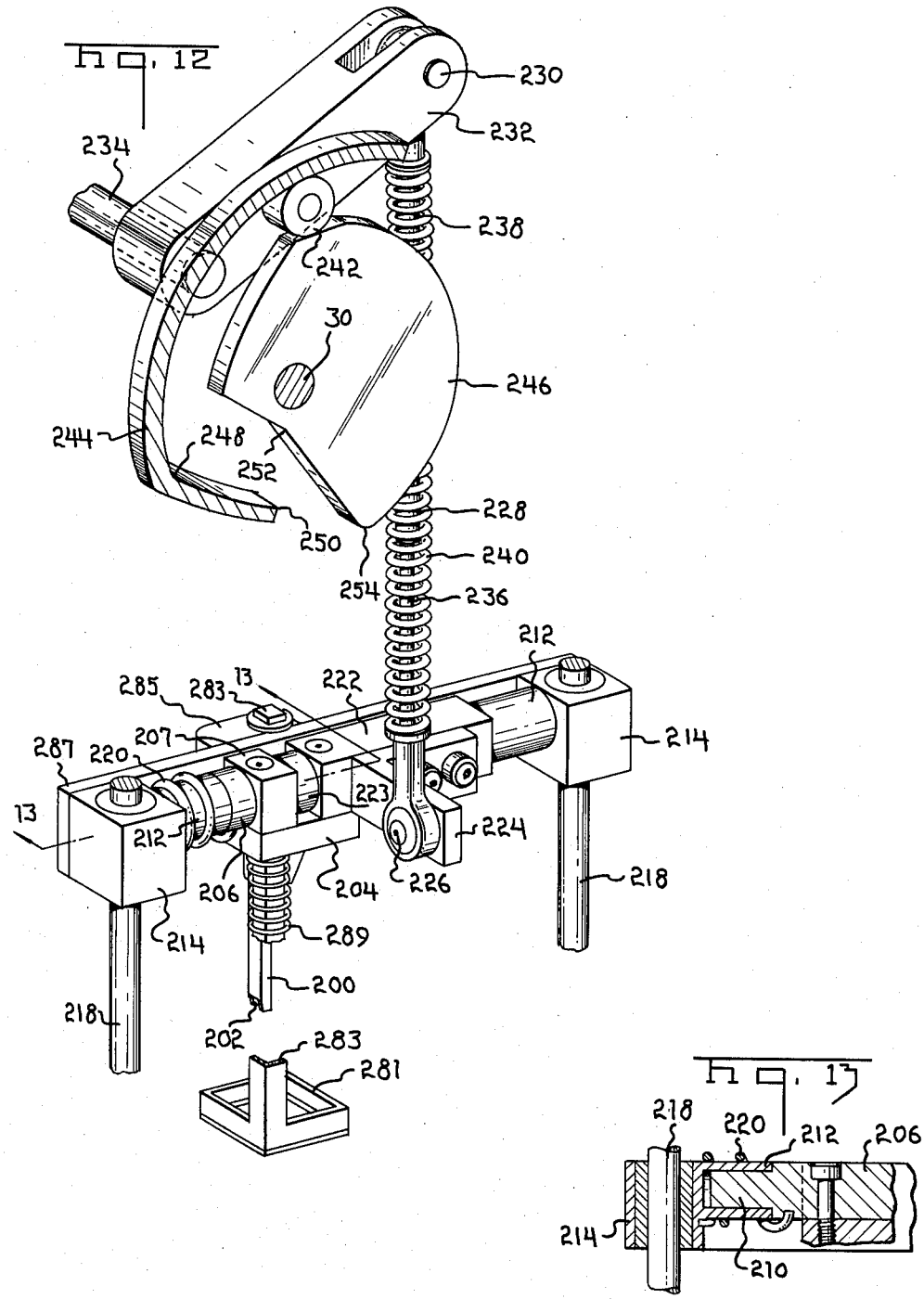

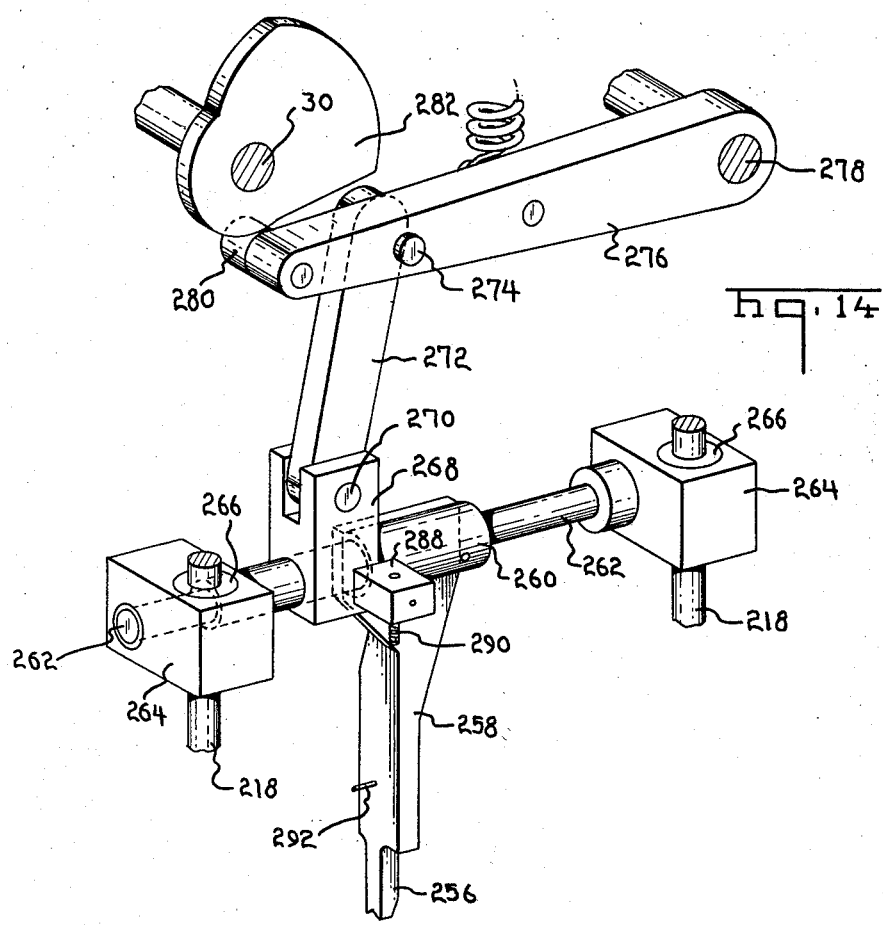

June 1, 1965  J. R. VICKERY, JR  3,186,077
APPARATUS FOR WIRING PANELBOARDS
Filed July 9, 1963  17 Sheets-Sheet 10

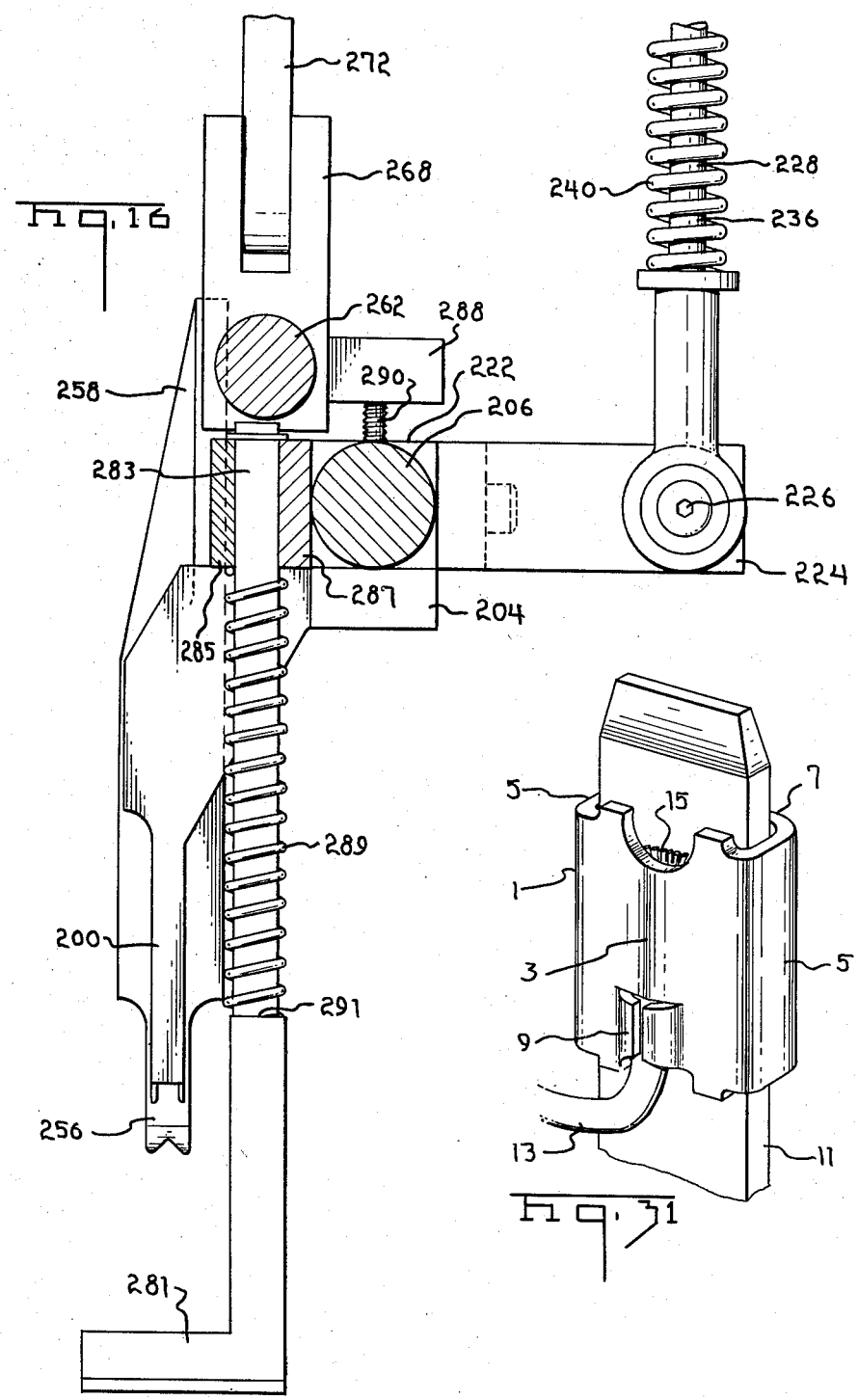

June 1, 1965   J. R. VICKERY, JR   3,186,077
APPARATUS FOR WIRING PANELBOARDS
Filed July 9, 1963   17 Sheets-Sheet 12
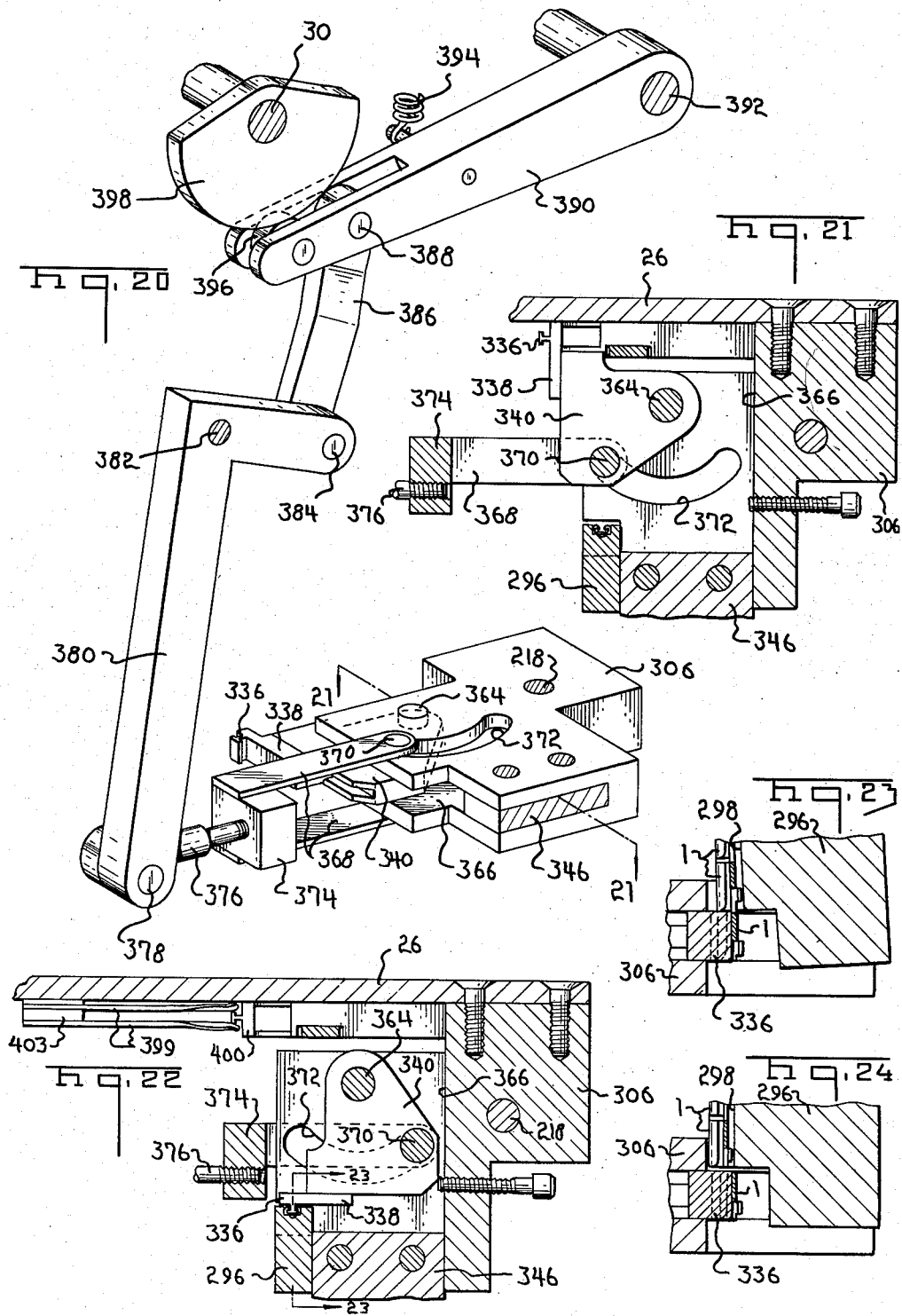

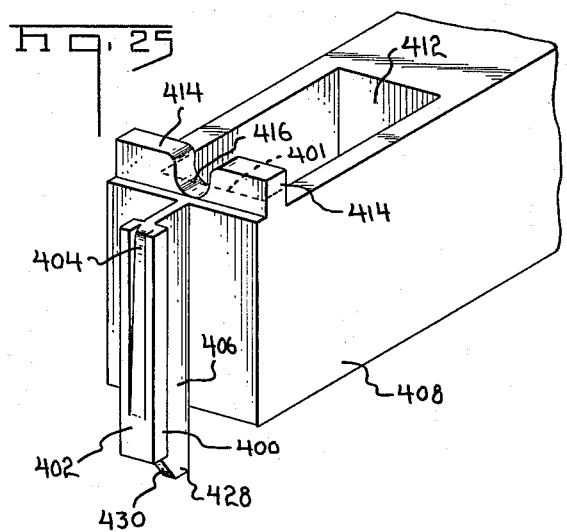
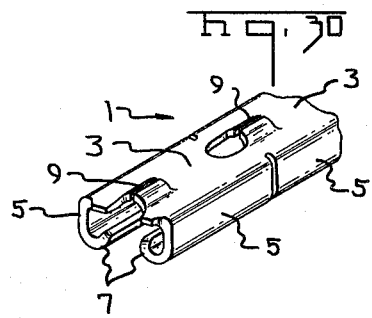
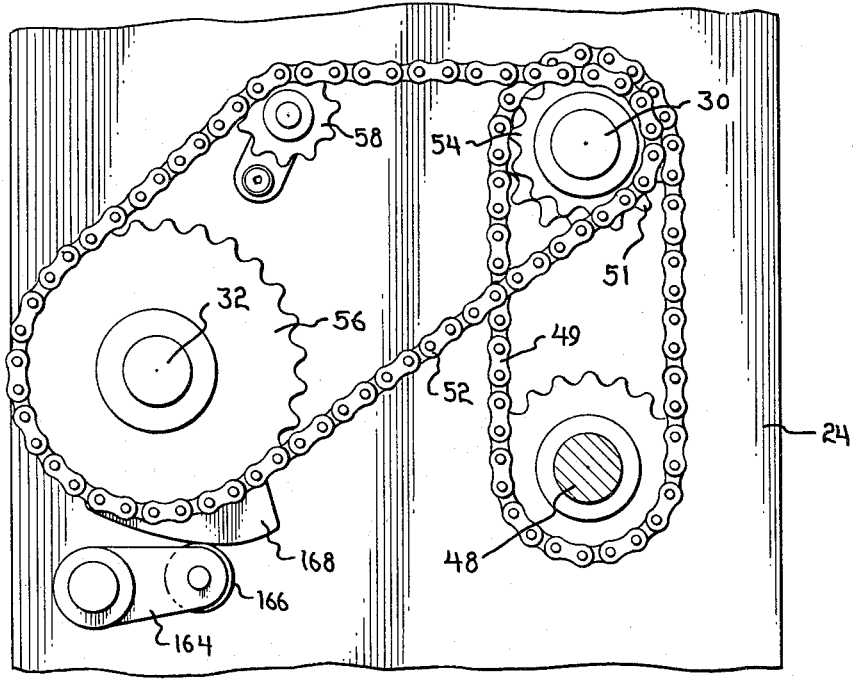

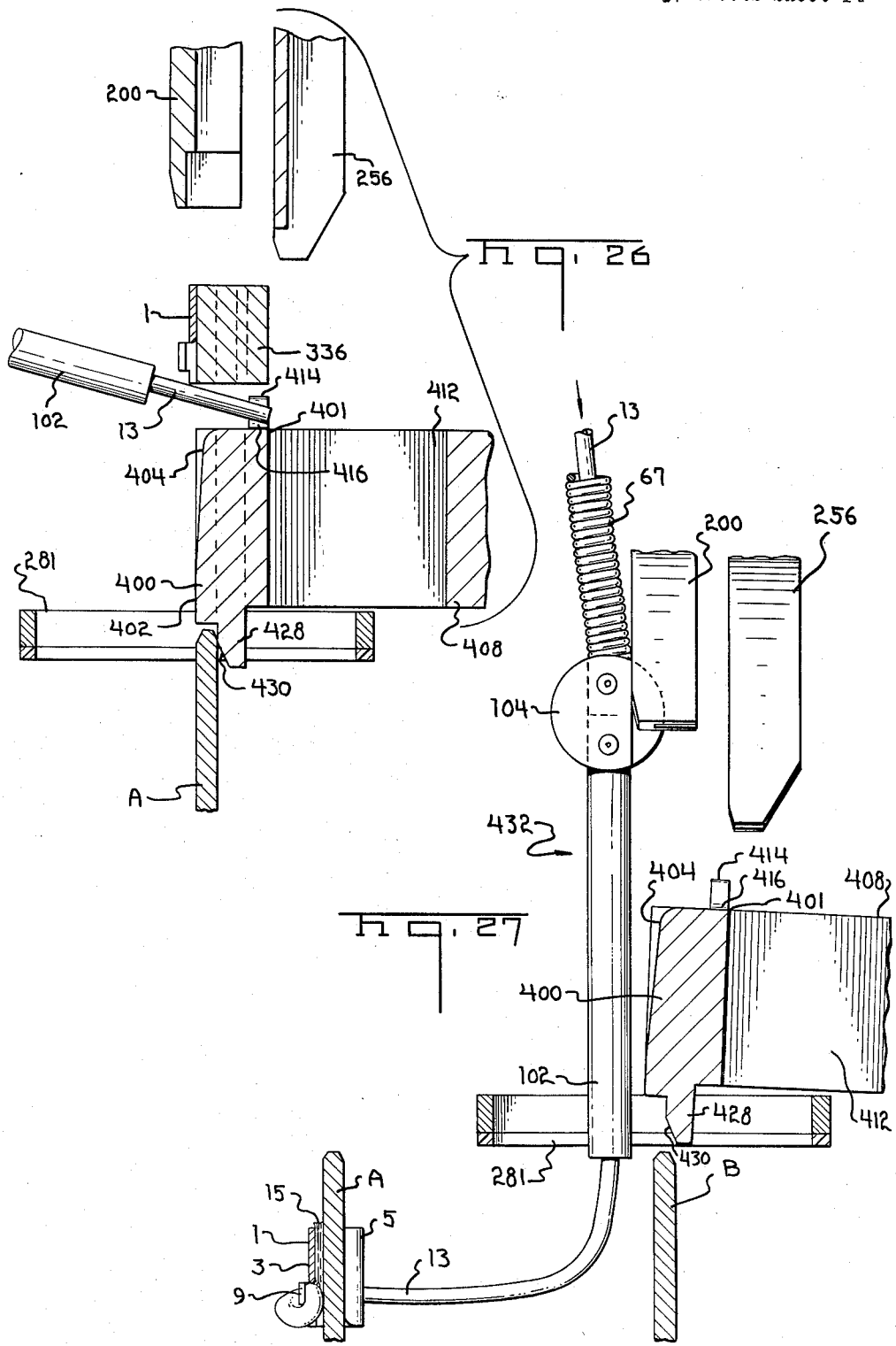

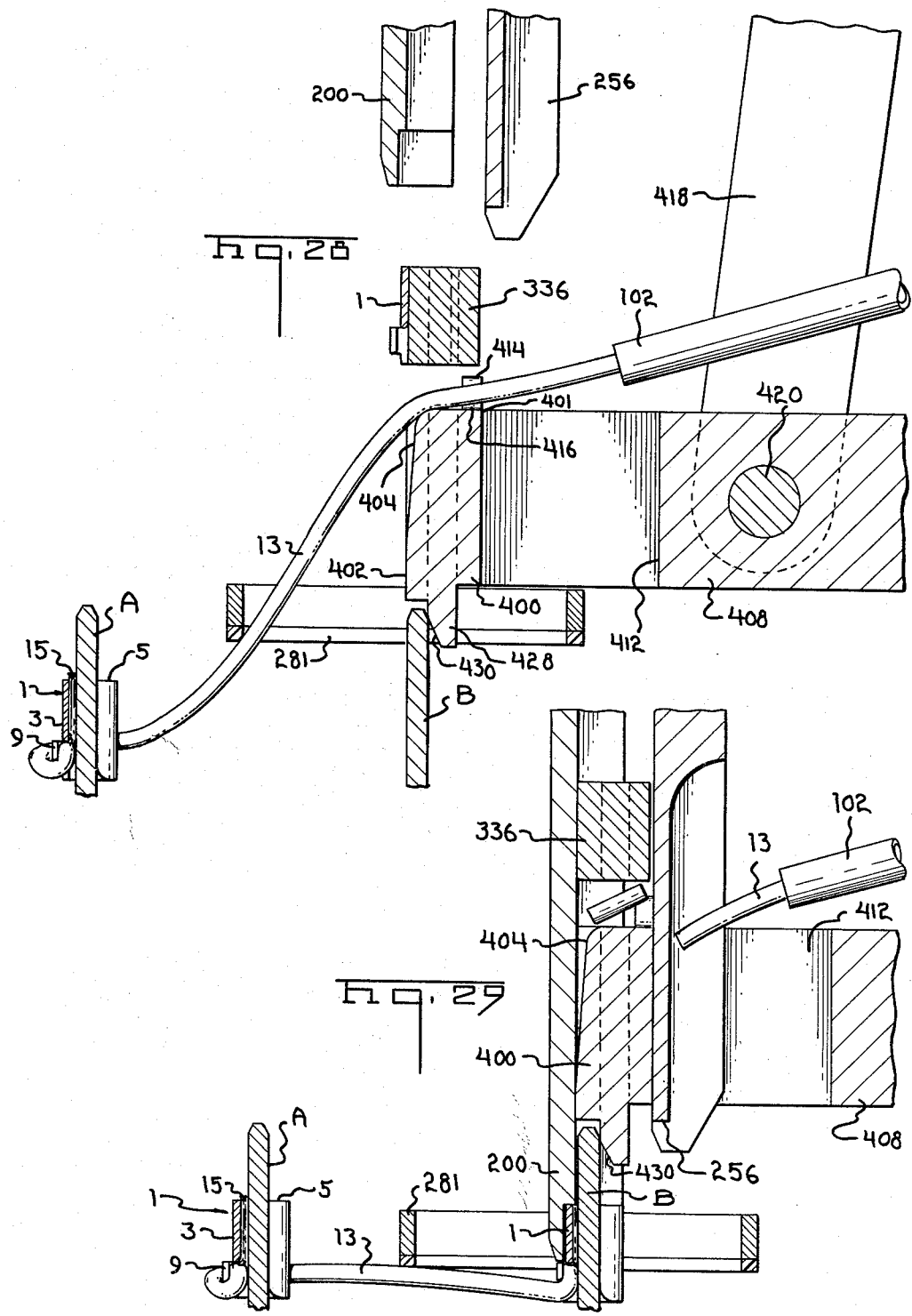

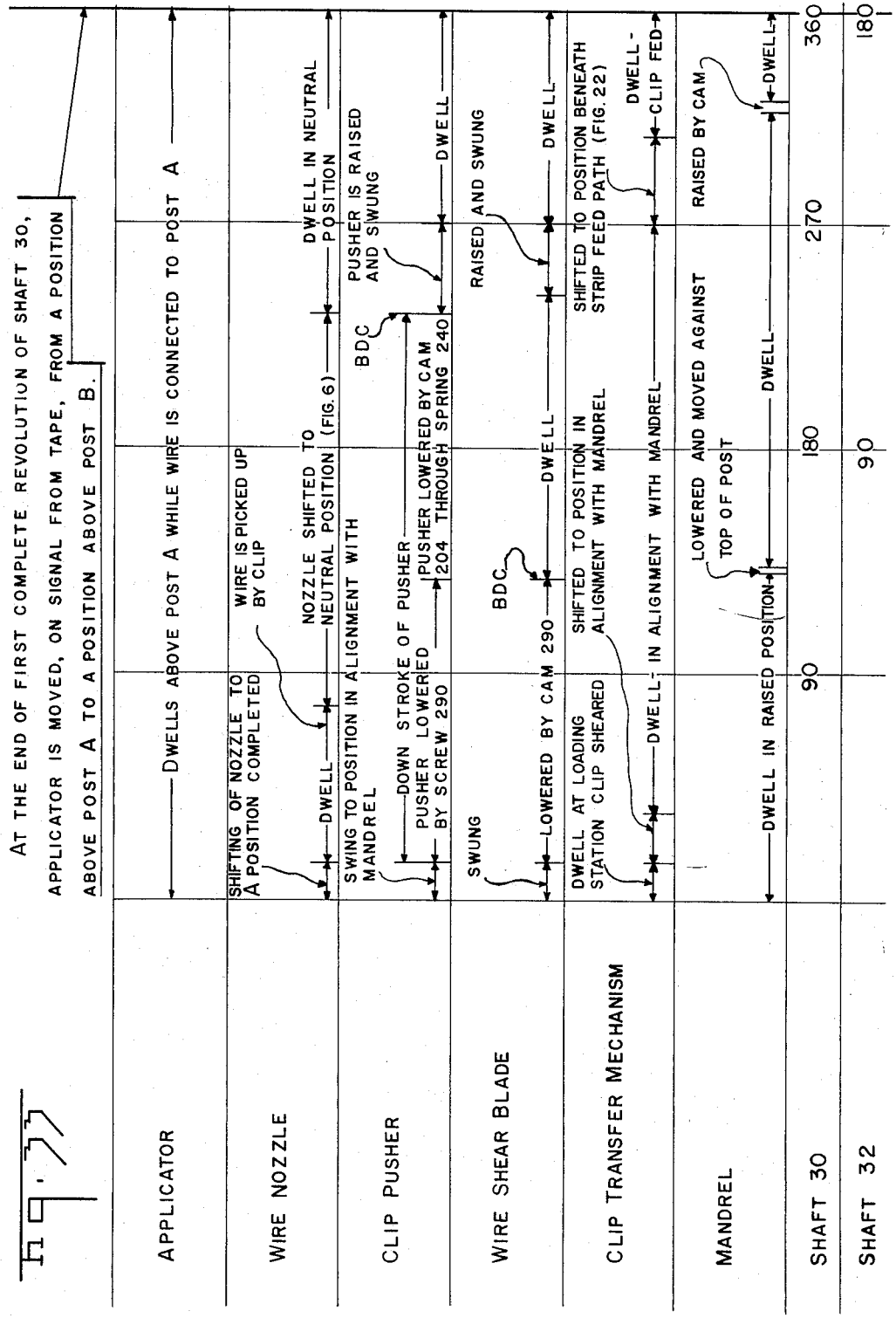

June 1, 1965　　　J. R. VICKERY, JR　　　3,186,077
APPARATUS FOR WIRING PANELBOARDS
Filed July 9, 1963　　　17 Sheets-Sheet 17

United States Patent Office 3,186,077
Patented June 1, 1965

3,186,077
APPARATUS FOR WIRING PANELBOARDS
John R. Vickery, Jr., York, Pa., assignor to
AMP Incorporated, Harrisburg, Pa.
Filed July 9, 1963, Ser. No. 293,602
13 Claims. (Cl. 29—203)

This invention relates to a method and apparatus for forming electrical connections between terminal posts on a wiring panelboard having a multiplicity of such posts mounted thereon.

The co-pending application of Robert F. Cobaugh, Serial Number 171,074, filed February 5, 1962, for Electrical Connections discloses and claims a method and apparatus for making electrical connections between insulated wires and terminal posts by means of open-sided clips which are adapted to embrace the post and hold the wire against its surface. In accordance with one embodiment of this Cobaugh invention, the wire is positioned with its axis extending transversely of the axis of the post and the clip is moved axially past the wire, over a mandrel, and onto the post so that its drags the wire over the surface of the mandrel and the post. The arrangement may be such that the insulation is stripped from the wire while it is dragged across the mandrel so that the clip holds an uninsulated end of the wire against the post while the portion of the wire which extends from the clip remains insulated. The above-mentioned Cobaugh application discloses one type of applicator for making electrical connections which is useable with a conventional work holding fixture which is relatively movable with respect to a panelboard thereby to permit the wiring of panelboards in a fully automatic and controlled manner.

It is an object of the present invention to provide an improved method and apparatus for wiring panelboards or the like in accordance with the above-identified Cobaugh application. It is a further object of the invention to provide an apparatus capable of carrying out the wiring operation at a relatively high speed. A further object is to provide an apparatus having an improved means for feeding wire during movement of the apparatus from a position above a first terminal post with which an electrical connection has been made to a position above a second terminal post with which an electrical connection is to be made. A further object is to provide a wiring machine for automatically wiring panelboards having an improved arrangement for laying the wire between the rows of terminal posts when the apparatus is moved from a position above a first terminal post to a position above a second terminal post. A further object is to provide an automatic wiring machine in which electrical connections between terminal posts can be made by withdrawing wire from a coil or other substantially endless source, and having an improved means for shearing the wire after an electrical connection has been made to a second terminal post of a pair of posts.

These and other objects of the invention are achieved in a preferred embodiment comprising an applicator having a reciprocable clip pusher and a reciprocable shear blade which are movable relatively towards the terminal post to which a connection is to be made. An individual clip is positioned in alignment with the clip pusher by means of a clip transfer device which is movable from a loading station, at which a single clip is picked up, to a position in alignment with the clip pusher. A mandrel, over which the clip is pushed, is disposed in alignment with the clip pusher and between the transfer device and the upper end of the terminal post. When the leading end of a wire is to be connected to a first terminal post, the wire is located with its axis extending transversely of the path of movement of the clip pusher and between the transfer device and the mandrel so that upon movement of the pusher towards the post, the clip is pushed relatively past the wire, over the mandrel, and onto the post. During this first operation, the wire will extend from the opposite side of the pusher from the side on which the shearing blade is located and since the leading end of the wire is being connected to the post, no shearing takes place. After the first connecting operation has been carried out, the applicator is moved to a position in alignment with the second terminal post of the pair of posts being connected. The wire is then oriented with its axis extending between the mandrel and the clip transfer device and thence transversely of the path of reciprocation of the shearing device from which it will extend through the feeding mechanism to the reel supply. Upon movement of the pusher and the shear blade towards the terminal post, the wire is sheared and the cut end is stripped and dragged over the mandrel and onto the post as described above.

A significant feature of the invention is that the wire extending from the reel is led between the pusher and the mandrel from either of two opposite sides; that is the wire extends from the reel across the mandrel and towards the shear blade when the first connection is being made but it extends from the reel across the path of reciprocation of a shear blade and then across the mandrel when the second connection is being made between a pair of posts. Such shifting of the wire is accomplished by means of a wire nozzle or guide through which the wire is fed and which is shiftable in synchronism with the movements of the clip pusher and shear blade.

The specific details of a preferred embodiment of the invention are described in the specification which follows and are shown in the drawing in which:

FIGURE 2 is a perspective view of the applicator in accordance with the invention, some of the parts having been broken away and others omitted from this view as described in the specification.

FIGURE 3 is a view similar to FIGURE 2 but showing only the frame work of the applicator, the rotating shafts, and the stationary rocker arm shafts.

FIGURE 4 is a fragmentary plan view of the back surface of the frame plate 26 showing the single revolution clutch by means of which the applicator is driven through a single operating cycle.

FIGURE 5 is a plan view of the plate 24 and showing the wire feed nozzle and the mechanism for shifting the end of the wire from one side of a terminal post to an intermediate position and to the opposite side of the post, the parts being shown in the positions they occupy when the wire is being connected to the first one of two terminal posts.

FIGURE 6 is a view similar to FIGURE 5 but showing the positions of the parts when the wire feed nozzle is in its intermediate position which it occupies during movement of the applicator from a first terminal post to a second terminal post.

FIGURES 7 and 8 are views taken along the lines 7—7 and 8—8 respectively of FIGURE 6.

FIGURE 9 is a view similar to FIGURE 5 but showing the positions of the parts when the wire is being attached to the second terminal post of a pair of posts being connected.

FIGURE 10 is a view taken along the lines 10—10 of FIGURE 9.

FIGURE 11 is a diagrammatic plan view showing a portion of a terminal board and illustrating the movements of the wire nozzle during a complete operating operation.

FIGURE 12 is a fragmentary perspective view showing the clip pusher, by means of which the clip is pushed onto the terminal post, and the associated guiding and actuating mechanism for the pusher.

FIGURE 13 is a view taken along the lines 13—13 of FIGURE 12.

FIGURE 14 is a fragmentary perspective view showing the wire shear blade and the guiding and actuating mechanism associated therewith.

Figure 15:
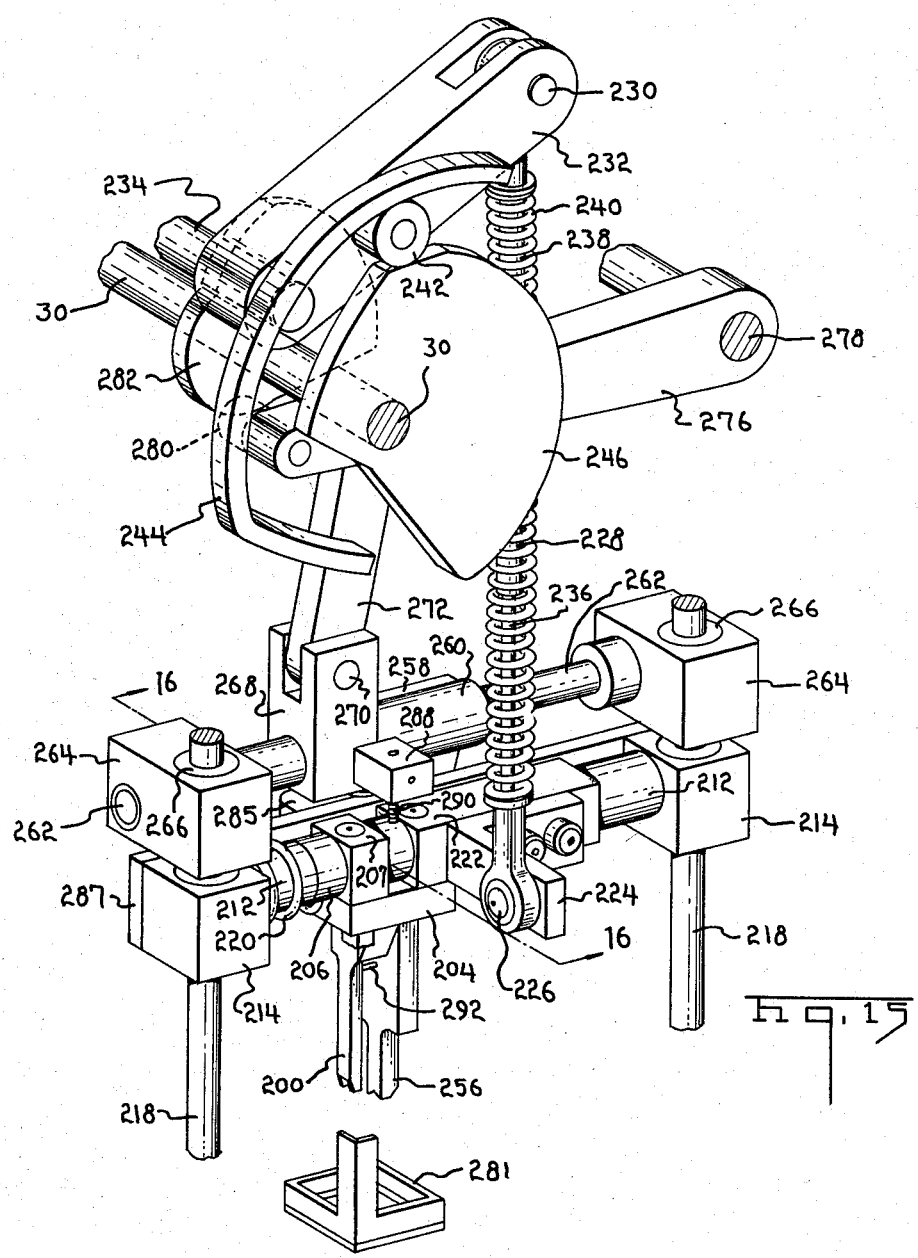

FIGURE 15 is a fragmentary perspective view showing both the clip pusher and the shear blade.

FIGURE 16 is a view taken along the lines 16—16 of FIGURE 15.

FIGURE 17 is a fragmentary sectional side view showing the clip feeding, guiding, and shearing mechanism and illustrating the manner in which the leading clip of the strip is fed onto the transfer device.

FIGURE 18 is a view taken along the lines 18—18 of FIGURE 17.

FIGURE 19 is a view similar to FIGURE 17 but showing the positions of the parts when the leading clip is sheared from the strip of clips.

FIGURE 20 is a perspective fragmentary view showing the clip transfer mechanism and illustrating the positions of the parts after a single clip has been positioned in alignment with the clip pusher.

FIGURE 21 is a view taken along the lines 21—21 of FIGURE 20.

FIGURE 22 is a view similar to FIGURE 21 but showing the positions of the parts when the transfer device is in alignment with the feed path of the strip of clips and is disposed at the clip loading station.

FIGURE 23 is a view taken along the lines 23—23 of FIGURE 22.

FIGURE 24 is a view similar to FIGURE 23 illustrating the severing of the leading clip from the strip.

FIGURE 25 is a fragmentary perspective view of the clip mandrel and mandrel bar.

FIGURE 26 is a fragmentary sectional view on an enlarged scale showing the positions of the wire nozzle, the mandrel, the transfer device, the clip shearing blade, and the clip pusher at the beginning of the operation of connecting the wire to the first of two terminal posts.

FIGURE 27 is a view similar to FIGURE 26 but showing the positions of the parts during the interval of movement of the applicator from the first post to which the connection is to be made to the second post.

FIGURE 28 is a view similar to FIGURE 26 but showing the positions of the parts at the beginning of the operation of connecting the wire to the second of two terminal posts.

FIGURE 29 is a view similar to FIGURE 28 but showing the positions of the parts at the end of the connecting operation.

FIGURE 30 is a perspective view of a short section of connector clips.

FIGURE 31 is a perspective view of a terminal post having a wire connected thereto by a connector clip.

FIGURE 32 is a plan view of the rearward side of the frame plate 24 and showing the chain drive for the power shafts.

FIGURES 33 and 34 are intended to be placed beside each other and show a timing diagram for the applicator.

Referring first to FIGURES 30 and 31, in accordance with the above-identified Cobaugh application an electrical connection between a terminal post 11 and a wire 13 is achieved by means of a clip 1 having a web 3 with upstanding sidewalls 5 on two opposite sides thereof. The sidewalls are reversely curled along their longitudinal edges 7 so that the clip is adapted to embrace the post and to hold the stripped end 15 of the wire against the surface of the post with the wire extending relatively downwardly along the post and emerging from the clip at its lower end as viewed in the drawing. Advantageously, an outwardly cupped insulation support 9 is provided on the web at its leading end for the accommodation of the end portion of the insulation of the wire.

Figure 1:
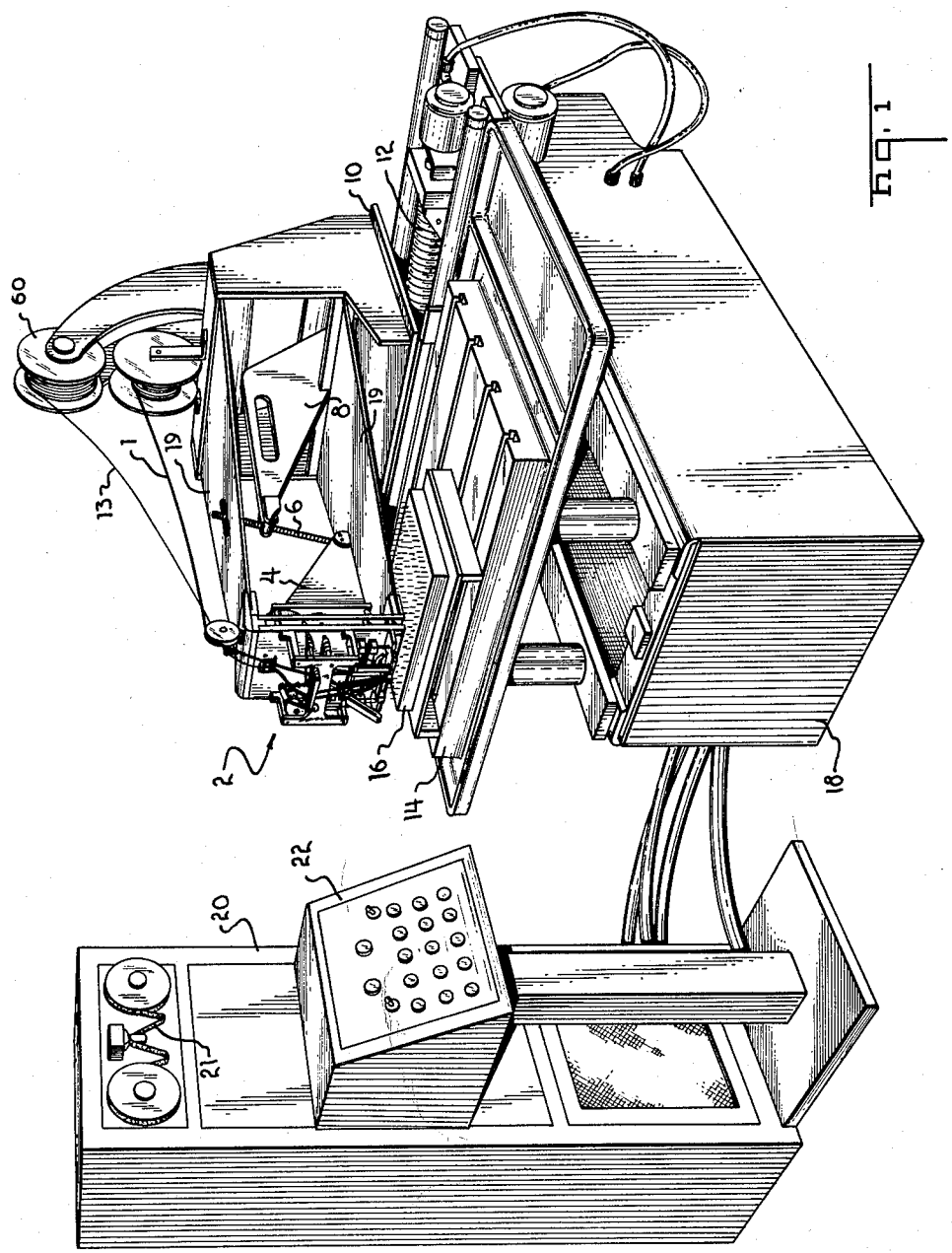
FIGURE 1 is a perspective view of a program controlled panel wiring machine equipped with a wiring applicator or head in accordance with the present invention.

The wiring machine in accordance with the invention, FIGURE 1, comprises an applicator or head 2 having a mounting bracket 4 secured thereto which is suspended by means of a rod 6 from a bracket 8. The bracket 8 extends from a coördinately movable carriage 10, the motion of the carriage being accomplished by a pair of rotatable screws, one of which is shown at 12. A panelboard 16, from which the terminal posts 11 project, is supported on a stationary table 14 which, in turn, is supported by a base 18. Wire 13 and terminal clips in strip form 1 are supplied to the applicator head 2 from reels which may be conveniently mounted on a carriage 10. In the disclosed embodiment, a pair of stabilizing plates 19 extend from the carriage and are secured to the applicator head to prevent lateral movement thereof and to assure precise positioning of the head with respect to the board 16.

The apparatus shown is capable of electrically connecting any two of the terminal posts 11 on the board 16. In general, the electrical connection between two posts is formed by first connecting the end of the wire 13 to the first post (herein designated as the A post), moving the applicator 2 to a position above the second or B post by means of the power screws, severing the wire 13, and connecting the end to the B post.

Advantageously, the operation is carried out by means of a controller 20 which, under the influence of a source of intelligence in the form of a punched tape 21, directs the complete wiring operation of the panelboard 16. A conventional manual control console 22 is provided to permit manual operation of the apparatus when desired for experimentation or adjustment.

The principles of the present invention can be grasped from a brief reference to FIGURES 26–29 and are described at this juncture to provide a background for the detailed description of the applicator 2. Referring first to FIGURE 26, when the end of the wire 13 is to be connected to the first one of a pair of terminal posts (the A post), the wire is positioned as shown in FIGURE 26 in which its end portion is emergent from a shiftable nozzle or guide 102. This end portion of the wire is disposed in FIGURE 26 with its axis extending between a mandrel 400 and a clip transfer device 336. With the parts in these positions, the axis of the wire will extend transversely of the web of a clip 1 on the transfer device and transversely of the A post. Upon downward movement of a clip pusher 200, the clip is pushed from the transfer device past the wire, over the mandrel, and onto the terminal post. As the clip moves past the wire, the leading edge of the clip forces the wire against the upper side of the mandrel, the edges of which cut into the insulation. Subsequently, and as the clip moves over the mandrel, the clip pulls the end portion of the metallic core of the wire from the end section of insulation and through a sloping groove 404 in the mandrel. When the clip comes to rest upon the A post the stripped end of the wire will be clamped against the surface of the post.

While the applicator is being moved from the A post to the B post, the nozzle 102 occupies the position of FIGURE 27 in which its axis extends substantially vertically. Wire is fed through the nozzle during such movement of the applicator thereby to provide the necessary length of wire to extend between the two posts. After arrival of the applicator at the B post the nozzle is shifted from the position of FIGURE 27 to the position of FIGURE 28 in which it is on the opposite side of the mandrel from the side over which the clip is moved. It will also be noted in FIGURE 28 that the nozzle has been moved slightly beyond a shear blade 256 which is in alignment with the clip pusher 200 and which is movable with the clip pusher. Upon downward movement of the clip pusher 200 and the shear blade 256 to the position of FIGURE 29, the wire is severed by the shear blade while the clip moves downwardly onto the B post to make an electrical connection between the wire and the B post. After upward movement of the shear blade and the pusher from the position of FIGURE 29, the nozzle is moved back to the position of FIGURE 26 while the applicator is moved to the next post (the A post) of the next pair of posts which are to be connected. A detailed description of the mechanisms for carrying out the steps shown in FIGURES 26–29 will now be described.

Referring to FIGURES 2 and 3, the frame of the applicator head mechanism comprises three substantially parallel plates 24, 26, and 28. Plates 24 and 26 are secured in spaced apart relationship to each other by suitable fasteners and spacers as shown. The H-shaped smaller frontal plate 28 is supported by means of brackets 23a, 23b, 23c, and 23d extending from the plate 26, a vertical brace 25 being provided between the brackets 23b and 23c.

The cams which actuate the various mechanisms of the applicator are mouned on two parallel shafts 30 and 32. The shaft 30 extends through the plates 24, 26 and between the plates 26, 28 while the shaft 32 extends only to the plate 26. As shown in FIGURE 32, the shaft 30 has a sprocket 54 on its rearward end and the shaft 32 has a sprocket 56 on its rearward end. A chain 52 passes over the sprockets 54, 56 and over an idler sprocket 58 so that the two shafts rotate together during operation. Power is supplied to the applicator from the output shaft 48 of a motor having a sprocket on its end. This sprocket is coupled by means of a chain 49 to a sprocket 51 on the shaft 30. As indicated by the relative sizes of the sprockets 54, 56, the shaft 30 makes two complete revolutions for each single revolution of the shaft 32. The complete operating cycle of the apparatus during which an electrical connection is made to an A post and a B post requires two revolutions of the shaft 30 and a single revolution of the shaft 32.

Referring now to FIGURE 4, a single revolution clutch on the shaft 30 comprises a pair of concentric sleeves 31, 33. A rotatable key 36 in the sleeve 33 is adapted to be rotated about its axis until it is received within a groove in the sleeve 31 thereby to engage the clutch. A spring 41 on the sleeve 31 biases a pin 39 which is integral with the key 36 in the manner such that the clutch is normally in engagement. A lever 38 pivoted at 40 to the plate 26 adjacent to the shaft 30 is normally biased by a spring 42 in a clockwise direction as viewed in FIGURE 4 towards the shaft so that its lower end engages the pin 39 and maintains the clutch in disengagement condition (as shown in the drawing) against the normal biasing force of the spring 41. When it is desired to engage the clutch for a single revolution of the shaft 30, a signal from the tape is supplied to a solenoid 46 driving the plunger 44 thereof leftwardly in FIGURE 4. This plunger is pivotally connected to the lever 38 and upon leftward movement of the plunger the lever is swung in a counterclockwise direction so that its lower end moves out of engagement with the pin 39. The spring 41 then causes the clutch to be engaged whereby the shaft 30 is driven through a single revolution and until the pin 39 again encounters the lower end of the lever 38. The signal supplied to the solenoid 46 is instantaneous so that immediately after engagement of the clutch and commencement of the single revolution of the shaft, the lever returns to its normal position and causes the clutch to be disengaged at the completion of the single revolution. As described below, the cams which actuate the mechanisms for forming an electrical connection with a terminal post (either the A or B post) are mounted on a shaft 30 so that this shaft must rotate two revolutions whenever a complete connection is made between two posts since each end of the wire is connected to one of the posts. The shaft 32 is rotated only one half of a revolution during each complete revolution of the shaft 30 since the cams on this shaft actuate the mechanisms which operate only once during a complete cycle.

The wire is fed from the reel 60 by means of a pair of feed rolls 62, 64 (FIGURE 2) through a guide tube 63 and through a flexible tube 67 which is disposed against the front surface of the plate 26. Roll 62 which is fixed with respect to the frame is contained in a housing 66 which, in turn, extends through an opening 68 in the plate 26. A flange 70 on the housing 66 (FIGURE 4) extends beyond the edges of the opening 68 on the rearward side of plate 26 and is secured to the plate by means of a fastener 72 and pins 74. Roll 62 is mounted on a shaft 76 for rotation therewith which shaft extends rearwardly of the plate 26 and has a gear 78 on its end in engagement with a gear 79 on the end of the output shaft of a motor 80. Adjacent to the gear 78, a gear 82 is provided on shaft 76 which meshes with a gear 84 on a shaft 65 on which the feed roll 64 is mounted. Advantageously, the gears 82, 84 have relatively large pitched teeth thereby to permit slight relative movement of the shaft 65 towards and away from the shaft 76 without complete disengagement of the gears.

Shaft 65 is rotatably supported in, and extends through, the upper end of a lever 86 pivoted at 90 to the rearward face of the plate 26. This lever extends downwardly past the shaft 30 and has a cam follower 92 mounted on an eccentric pin 94 at its lower end. Cam follower 92 engages a circular cam 96 mounted on the sleeve 31 for rotation therewith, the cam 96 having a notch on its periphery which is substantially diametrically opposite to the pin 39. Lever 86 is normally biased in a counterclockwise direction as viewed in FIGURE 4 by means of a spring 100 having one end secured to a pin in the plate 26 and having its other end secured to a pin in the lever as shown in FIGURE 2. The spring 100 thus normally biases the movable roll 64 against the surface of the roll 62 in which position wire is fed by the rolls through the guide tube 67, however, during periods of rotation of the shaft 30, that is when the clutch is engaged and the cam 96 is rotating, this cam will swing the lever in a clockwise direction about its pivotal axis 90 to disengage the wire feed.

As will become apparent as the description proceeds, wire will be fed by the rolls only while the applicator 2 is moving relative to the panelboard from an A post to a B post thereby to draw from the supply reel 60 a length of wire sufficient to reach between the two terminal posts being connected. When the applicator is positioned above a terminal post and a connection is being made, the shaft 30 will be rotating and the cam 96 will disengage the feed rolls from the wire.

The mechanism for shifting the wire nozzle 102 on the end of guide tube 67 to the several positions shown in FIGURES 26–29 will now be described with reference to FIGURES 5–10. The wire nozzle 102 is mounted in the end of a bar 104 which extends between the plates 24, 26 and slightly beyond the surface of the plate 26 as shown in FIGURE 27. This bar has rotatable cam rollers 106 thereon which are spaced apart by a distance equal to the spacing between the plates 24, 26. Bar 104 extends through aligned cam openings 108 in the two plates so that the followers are in engagement with the edges of these openings to guide the movements of the nozzle. Both of these openings 108 have generally arcuate upper sides 110 with three spaced apart pockets 112, 114, 116 on their lower sides. Upwardly extending humps 118, 120 on the lower side of the cam openings separate the three pockets, the hump 118 being relatively higher than the hump 120.

A pair of spaced apart ears 122 integral with the bar 104 extend from this bar and between the frame plates 24, 26. These ears 122 are received in aligned slots 124 in a pair of spaced apart arms 126 which extend from a hub 128. The hub 128 is secured to a shaft 130 which extends through the hub and which has a bearing in the plate 26 and which extends through and has a bearing in a block 132 secured to the rearward side of the plate 24. An oversized opening is provided in the plate 24 through which a pair of fingers 138 project on each side of the shaft 130. These fingers have bevelled ends 140 which bear against the lefthand side of the hub 128 as viewed in FIGURE 7. A complementary V-groove 142 extends across the hub 128 so that when the hub is rotated to a position such that the groove is in alignment with the bevelled ends 140 of the fingers, the hub is permitted to move leftwardly in FIGURE 7. When the hub is rotated from the position of FIGURE 7, the bevelled ends of the fingers 138 will move out of the groove 142 causing rightward movement of the hub. Hub 128 is normally biased leftwardly in FIGURE 7 by means of a spring 136 which surrounds the projecting rearward end of the shaft 130 and is effective between a head 134 on the end of the shaft and the opposed face of the block 132. Normally, and during most of the operating cycle, the bevelled ends of the fingers 138 are not seated in the V-groove 142, that is the hub and the arms are positioned relatively as shown in FIGURE 10. As is explained below, it is desirable to permit the hub to move leftwardly in FIGURE 7 until the ends of the fingers are seated in the V-groove during laying of the wire from the A post to the B post.

A link 144 extends between the arms 126 of the hub 128 and is pivotally connected by means of a pin 146 to the spaced apart ears 122 of the bar 104. This link extends leftwardly in FIGURE 5 beyond its pivotal connection to the ears 122 and has a downwardly extending end portion 145 which defines a pocket 147 adjacent to pivotal axis 146. Link 144 is pivoted at its opposite end 150 by means of a clevis 148 to a two-part lever 152, 154, the two parts of this lever being pivotally connected at 156 in a manner which permits limited movement of the lower part 152 towards and away from the plate 24. The upper part 154 of the lever is pinned or otherwise secured to a shaft 158 which, in turn, is rotatably supported in the plate 24 and which extends through the plate 24 to the rearward face thereof. At its upper end, the part 154 of the lever is provided with a cam follower 160 which engages a cam 162 on the low speed shaft 32.

On the opposite side of the plate 24 from the side shown in FIGURES 5 and 6, an arm 164 is secured to and extends from the shaft 158. This arm has a follower 166 on its end which is engaged by a cam 168 mounted on shaft 32 on the rearward side of the plate 24.

FIGURE 5 shows the relative position of the nozzle 102 when the wire is connected to the A post. Towards the end of the process of forming this connection between the wire and the A post, the nozzle must be shifted from the position shown in FIGURE 5 to the position shown in FIGURE 6. Such shifting of the nozzle is effected by the cam 168 which has a rise 176 on its periphery for engagement with the cam follower 166 on the arm 164. As this rise 176 of the cam moves relatively past the follower 166, the shaft 158 is rotated counterclockwise so that the lower end of the lever 152, 154 swings along an arcuate path about the center of shaft 158. Such movement of the lever 152, 154 has the effect of pulling the bar 104 upwardly and over the hump 120 of the cam opening in the plates. The cam 168 is provided with a dwell portion which holds the bar 104 in the position of FIGURES 6 and 7, the position occupied by the parts during movement of the applicator from the A post to the B post. When the bar moves from the position of FIGURE 5 to the position of FIGURE 6, it also pulls the arms 126 along a clockwise path and thereby rotates the hub 128 and the shaft 130 relative to the block 132. As the hub moves into the position of FIGURE 6, the V groove 142 is brought into alignment with the bevelled ends of the fingers 138 causing the hub, the bar, and the nozzle to move leftwardly in FIGURE 7.

When the applicator arrives at the B post, the nozzle must be shifted to the position of FIGURE 9, which is effected by further rotation of the cam 168 causing further counterclockwise swinging of the lower end of the lever 152, 154. Because of the height of the hump 118 separating the center pocket 114 of the cam opening in the plates and the righthand pocket 116, it is necessary to provide an auxiliary lifting mechanism for raising the bar 104 over the hump portion of the cam opening. This auxiliary lifting mechanism comprises a pair of lifting arms 178 which have end portions 182 extending beneath the bar 104 and on each side of the hub 128. These lifting arms 178 are substantially L-shaped and are pivoted at their upper ends on a pin 180 which extends between the plates 24, 26. Adjacent to the pivoted upper ends of these arms, a link 184 is pivotally connected at 183 to the arms and has its upper end pivotally connected at 186 to a lever 188. This lever is mounted for free rotation on the shaft 158 and has a cam follower 192 on its upper side which is engaged to the cam 194 on the shaft 32. The contour of the cam is such that during the brief interval when the nozzle is being shifted from the position of FIGURE 6 to the position of FIGURE 9, the lever 188 is permitted to move through a short arc in a clockwise direction. This motion of the lever is brought about by means of a spring 196 connected to the upper end of the link 184 and to a suitable pin on the plate 24. At the appropriate time in the cycle then, that is when the nozzle is to be shifted from the position of FIGURE 6 to the position of FIGURE 9, the relieved portion of the cam 194 comes into contact with the roller 192 and the spring 196 is permitted to effect a slight upward pull on the lever 184. Such movement of the lever has the effect of swinging the arms 178 through a short arc in a counterclockwise direction so that the ends 182 of the lifting arms will lift the nozzle support structure over the hump 118.

After the wire has been attached to the B post and severed, it is, of course, necessary to shift the nozzle from the position of FIGURE 9 back to the position of FIGURE 5. Such shifting of the nozzle is effected by a cam 162 on the shaft 32 which engages the roller 160 on the upper end of the lever part 154 it will be apparent that the cam will cause the lever 152, 154 to be swung in a clockwise direction about its pivotal axis 158 and return the parts to the position of FIGURE 5. Since the cam 162 would ordinarily pass through the plane occupied by the lever 188, an arcuate cut-out section 193 is provided on the upper surface of this lever, the cam follower 192 being disposed behind the plane occupied by the cam 162.

Turning now to FIGURES 12 and 13, the clip pusher 200 has a generally channel-shaped cross section and has a cavity or recess 202 at its lower end in which the clip is nested while it is being pushed. This clip pusher has an enlarged upper end 204 which is secured to an oscillatory shaft 206 having two rectangular center sections 207, 222 which are separated by a cylindrical shaft portion 223. The ends 210 of shaft 206 are of reduced diameter and are rotatably received within sleeves 212 (FIGURE 13). These sleeves are integral with a pair of blocks 214 which are slidably mounted on a pair of parallel guide rods 218 disposed between the plates 26 and 28. The lefthand one of these guide rods extends vertically between the bracket 23c and is received within a block 219 at its lower end which block is secured to a plate 26. The righthand guide rod is supported at its upper end by the bracket 23d into which it extends and is supported at its lower end by a block 306 also secured to the plate 26. A torsion spring 220 surrounds the lefthand one of the sleeves 212 and has one end secured or anchored on the sleeve and its other end extending into a drilled hole in the shaft 206 to bias the shaft in a clockwise direction as viewed from the left in FIGURE 12. An L-shaped bracket 224 is fastened to the central rectangular section 222 of the shaft 206 and has a forwardly extending arm which is pivotally connected at 226 to a connecting rod generally indicated at 228. This connecting rod is pivoted at its upper end 230 to a rocker arm 232 on a stationary shaft 234. Connecting rod 228 is formed in two sections 236, 238 which are telescopically movable with respect to each other thereby to permit effective shortening of the length of the connecting rod. A compression spring 240 surrounds the connecting rod 228 and acts between shoulders provided on the two sections of the rod to bias the parts of the connecting rod to an extended position with respect to each other.

A cam roller 242 provided on the rocker arm 232 intermediate its ends is engaged by cams 244, 246 on the high speed shaft 30. The cam 244 has the effect of swinging the rocker arm 232 in a clockwise direction about the axis of shaft 234 to lower the shaft 206 and the clip pusher 200. The portions of this cam which effect lowering of the clip pusher extend between the datum points 248, 250 of the cam. The cam 246 raises the clip pusher upon engagement of the sections 252, 254 with the cam follower. It will be apparent from FIGURE 2 that the cam 246 is nested within the cam 244 which only partially surrounds the shaft 30.

It should be mentioned at this point that the clip pusher 200 is moved through a part of its downward stroke by the mechanism and linkage, described immediately below, which actuates the wire shear blade 256. It should also be mentioned that the connecting rod 228 is provided as two telescoping sections with an interposed spring for the purpose of preventing the imposition of an unduly high pushing force on the connector clip as it is moved over the terminal post. The significance of these features of the actuating mechanism for the clip pusher will become apparent from the description of the operating cycle of the apparatus.

FIGURE 14 shows the shearing mechanism for shearing the wire when an electrical connection is being made with a B post (FIGURES 28 and 29). The depending shear blade 256 is disposed beside and in alignment with the clip pusher 200 and has an upper shank portion 258 which is rearwardly offset at its upper end and is secured to a collar 260. This collar is pinned or otherwise mounted on a transversely extending shaft 262 which has its ends rotatably received in blocks 264. The blocks 264 are slidably mounted by means of bearings 266 on the guide rods 218 above the blocks 214 which support the shaft 206. As shown in FIGURES 15 and 16, the shaft 262 is disposed rearwardly of the shaft 206, that is relatively towards the plate 26 as viewed in the drawing.

A block 268 is mounted on shaft 262 adjacent to collar 260, the shaft being rotatable with respect to the block. At its upper end this block has a pivotal connection 270 with a link 272 which extends upwardly and is pivotally connected at 274 to a rocker arm 276 on a stationary shaft 278. A cam follower 280 on the end of rocker arm 276 is engaged by the periphery of a cam 282 mounted for rotation on the shaft 30. This cam causes the rocker arm 276 to be swung in a counterclockwise direction as viewed in FIGURE 14 about its pivotal axis 278 thereby to move the shaft 262 downwardly and to drive the shear blade 256 downwardly past the wire extending from the nozzle in FIGURE 28. The rocker arm 276 is normally biased in a clockwise direction by means of a spring as shown.

A block 288 is secured to, and extends forwardly from, the block 268. A screw 290 in this block extends downwardly from the underside thereof and has its axis extending transversely of the circular intermediate portion 223 of the shaft 206. During downward movement of the clip pusher 200 and the shear blade 256, the screw 290 comes into engagement with the portion 223 of the shaft 206 during the brief interval when the wire is being drawn over the mandrel. It is during this interval that the highest thrust is applied to the clip.

A pin 292 extends from the shank 258 and into the channel shaped clip pusher 200. During upward movement of the shafts 206, 262 the blocks 264 reach the limit of their upward stroke prior to the blocks 214. Upon upward movement of the blocks 214 and the shaft 206 after the blocks 264 have come to rest, the circular portion 223 of the shaft 206 comes into engagement with the lower end of the screw 290. Since the shaft 206 can not move upwardly after it has engaged the screw 290, it is caused to rotate through a relatively short arc in a counterclockwise direction as viewed in FIGURE 16 against the normal biasing force of the spring 220. Such rotation of the shaft 206 causes the clip pusher to swing through a relatively short arc away from the plane of the frame plate 26. The pin 292 which extends into the groove in the channel shaped clip pusher causes the shear blade to swing in the same direction. This movement of the clip pusher and the shear blade is necessary in order to permit the wire nozzle and its associated supporting structure to be shifted from the intermediate position to the B position.

It is advantageous to provide a wire dressing means for pressing the wire downwardly against the surface of the board when it is connected to the B clip. The provision of this dressing means results in the positioning of the lead wire extending from the A post to the B post close to the surface of the board and below the level of the upper ends of the terminal posts. In the disclosed embodiment this dressing means is in the form of an open frame 281 having an upwardly extending shank 283 on one of its corners. This shank extends slidably through a block 285 mounted on a bar 287 which extends between and is secured to the blocks 214. A washer on the upper end of the shank 283 retains the shank in position while a spring 289 is interposed between a shoulder 291 and the underside of the block 285. As indicated in FIGURE 29, the open frame 281 moves ahead of the clip pusher during downward travel of the pusher to dress the wires and position them against the surface of the board. The frame 281 will reach the limit of its downward travel prior to the time the clip pusher reaches the limit of its downward travel so that during the final portion of the downward stroke of the clip pusher, the block 285 moves relatively downwardly over the shank 283 with concomitant compression of the spring 289. It will be noted in FIGURE 16 that the shank 283 is in vertical alignment with the shaft 262 and the upper end of the shank is disposed adjacent to this shaft when the parts are in their normal positions. The relative movement between the shank and the block 285 is possible because of the fact that the shaft 262 reaches the limit of its downward movement prior to the time the shaft 206 reaches the limit of its downward movement as indicated on the timing diagram of FIGURES 33 and 34.

Referring now to FIGURES 17–19, the strip of terminal clips is fed from the reel mounted on the carriage 10 across the top of the upper stabilizing plate 19, over a guide roll, and thence through a channel-shaped groove 298 in a feed guide block 296. The block 296 is pivotally mounted adjacent to its upper end by means of a pin 300 on a vertical support bar 302 which is secured at its upper end to an inwardly projecting arm 304 on frame member 23d and is secured at its lower end to a fixed block 306 extending from the plate 26 (see FIGURE 3). A cover plate 308 on the guide block 296 extends over the guide channel 298 for a substantial portion of its length and adjacent to the lower end of the guide channel has an inwardly turned retaining finger 310 which lodges between adjacent clips in the strip and prevents retrograde movement of the strip. The clips are fed during each cycle past a notch at the lower end of the block 296 by means of a clip feed pawl 312 which is pivotally connected at 314 to links 316 on each side of the block 296. A torsion spring normally biases feed pawl 312 in a counterclockwise direction and into engagement with the strip of clips. The links are mounted on a common pivot pin 320 which extends through the block 296 and extend rightwardly in FIGURE 17 beyond the block and are pivotally connected at 322 to a connecting rod 324. The connecting rod extends upwardly beside the block 296 and is secured to an adapter piece 326 (FIGURE 2) at its upper end which projects forwardly from the axis of the rod 324. The adapter is, in turn, secured to a rod 328 which extends upwardly and is pivotally connected at 330 to a rocker arm 332 rotatably mounted on the shaft 334. A cam follower 333 on the end of rocker arm 332 engages the periphery of a cam 335 on the shaft 30. It will be apparent that for each complete rotation of the shaft 30, the rocker arm 332 is oscillated about its pivotal axis 334 thereby to reciprocate the feed pawl 312 and to feed the leading clip of the strip downwardly as viewed in FIGURES 17 and 19.

The leading clip is fed from the block 296 onto a T-shaped projection 336 of a transfer device described more fully below. After feeding of this leading clip onto the projection 336, the leading clip is separated from the strip by swinging the block 296 through a slight arc in a clockwise direction as viewed in FIGURE 17. Such swinging of the block 296 is effected by means of a bell crank 342 pivotally mounted at 344 on a pin which extends from a support block 346 which, in turn, is secured to the block 306. A screw 348 is threaded through the upwardly extending arm of the bell crank for engagement with the side of the feed guide block 296 while the rightwardly extending arm of the bell crank as viewed in FIGURE 17 is pivotally connected at 350 to a connecting rod 352. This connecting rod extends upwardly (FIGURE 2) and is pivotally connected at its upper end 354 to a rocker arm 356 disposed beside the rocker arm 332 on the shaft 334. A cam follower 358 on the end of the rocker arm 356 is engaged by the periphery of a cam 360 on shaft 30. A spring 362 connects the vertically extending arm of the bell crank and the lower end of the guide block 296 normally to bias the guide block in a counterclockwise direction about its pivotal axis 300 and against a stop bar 361 secured to, and extending from, the block 302. Upon relative upward movement of the connecting rod 352, the end of the screw 348 comes into engagement with the block 296 and swings this block through a short arc in a clockwise direction about its pivotal axis 300 whereby the axis of the strip of terminal clips disposed in the channel 298 is moved relatively leftwardly in FIGURE 17 with respect to the connector clip which has been fed onto the projection 336. As a result, this leading connector clip is sheared from the next adjacent clip and can be transferred to a position in alignment with the mandrel and the clip pusher.

Referring now to FIGURES 20-22, the T-shaped projection 336 which carries the clip from the loading station to a position in alignment with the pusher is integral with a bar 338 which, in turn, is secured to a plate 340. This plate is received within a deep slot or recess 366 in the block 306 which is secured to the frame plate 26. The plate 340 is pivotally mounted on a pin 364 which extends through the block 306 and through a recess 366, the plate itself being contoured and dimensioned such that the projection 336 will be shifted from the position of FIGURE 21 (where it is in alignment with the clip pusher) to the position of FIGURE 22 (the clip loading station) upon swinging of the plate about the axis of the pin 364. This swinging of the plate 340 is effected by means of a bell crank pivoted at 382 to ears 383 extending from the frame member 23c. A depending arm 380 of this bell crank is pivoted at its lower end 378 to a connecting rod 376 having a block 374 on its end. A pair of parallel plates 368 are secured to the block 374 and extend on each side of the block 306. A pin 370 extends through the ends of these arms, through arcuate slots 372 in the block 306 and through the plate 340. It will thus be apparent that upon counterclockwise movement of the bell crank about its pivotal axis 382, the projection 336 will be shifted from the position shown in FIGURE 21 to the position of FIGURE 22 while clockwise motion of the bell crank about its pivotal axis will result in the reverse movement of the clip carrying projection.

Such swinging of the bell crank is effected by a rocker arm 390 on a rocker arm shaft 392. This rocker arm is pivotally connected at 388 to one end of a link 386, the other end of this link being pivotally connected at 384 to the upper arm of the bell crank. A cam follower 396 on the end of rocker arm 390 is engaged by the periphery of the cam 398 on shaft 30. This cam causes the rocker arm 390 to swing in a counterclockwise direction only, the reverse motion of the rocker arm being brought about by a return spring 394 having one end hooked over a pin on the rocker arm and having its other end fixed to a pin in the plate.

The mandrel 400 (FIGURE 25) is of generally T-shaped cross section and has a head portion 402 and a central rib 406 which is integral with mandrel arm 408. An inclined groove 404 extends partially along the surface of the head 402 from the upper end of the mandrel to facilitate cutting of the insulation of the wire and withdrawal of the conducting core thereof from the severed section of insulation while the clip moves over the mandrel.

The mandrel arm 408 is pivotally mounted at its right-hand end to permit limited arcuate motion of the mandrel towards and away from the terminal post with which an electrical connection is being made. An opening 412 extends through the mandrel arm adjacent to the mandrel itself to permit passage of the shear blade 256. Advantageously, a pair of upwardly extending ears 414 are provided on the mandrel arm on each side of the rib 406 to define a positioning and centering slot 416 for the wire when a connection is being made with a B post (FIGURES 28 and 29).

Rib 406 extends downwardly beyond the head 402 of the mandrel as indicated at 428 (see FIGURE 26). The side of this extension which is disposed against the terminal post to which a connection is being made has an obliquely extending surface 430, the length of the extension 428 and the length of the mandrel head 402 being such that when the mandrel is brought into position in alignment with the terminal post, a gap remains between the top of the post and the lower end of the mandrel head 402.

The limited arcuate movement of the mandrel bar and the mandrel is brought about by means of a cam 426 on shaft 30 which engages a cam follower on a rocker arm 424 on shaft 334. A connecting rod 418 is pivotally connected to this rocker arm at its upper end 417 and at its lower end 420 to the mandrel bar.

The reason for providing this limited arcuate movement of the mandrel stems from the fact that for best results, the axis of the terminal post should be in substantial alignment with the head 402 of the mandrel when the clip is pushed downwardly from the position of FIGURE 28 to the position of FIGURE 29. If the terminal posts are precisely positioned at their proper locations in accordance with the grid system of the panel, and if the applicator is precisely located above the terminal post with which a connection is to be made, the post and the mandrel will be properly located with respect to each other. As a practical matter, however, the posts will not always be positioned on the terminal board at the precise locations called for by the grid system of the terminal board since allowances must be made for manufacturing tolerances. Furthermore, the posts will not always extend precisely vertically from the board but may be bent slightly. It has been found, therefore, that it is desirable to slightly bend or flex the post under some circumstances in order to assure alignment of the post and mandrel under all possible conditions of misalignment. Specifically, the post is flexed slightly leftwardly in FIGURES 26 and 28 if it is perfectly positioned and straight or if it is displaced rightwardly or bent rightwardly from its intended position. Such leftward flexure of the post will take place as the mandrel bar swings in a counterclockwise direction through a short arc whereby the bevelled surface 430 comes into engagement with the bevelled post. The effect of flexing the post under these circumstances (i.e. the post is properly positioned and straight or the post is rightwardly displaced from its intended position or bent rightwardly from the vertical) is to bring the upper end of the post into alignment with the head 402 of the mandrel. If the post is displaced slightly leftwardly from its proper position or if it is bent leftwardly as viewed in FIGURES 26 and 28, the post will not be flexed during arcuate movement of the anvil but will occupy a position in alignment with the head of the mandrel when the latter member comes to rest.

The above described arcuate movement of the mandrel is also desirable since the mandrel must be raised above the level of the tops of the posts when the applicator 2 is moved relatively across the surface of the board from one post to another post. The arcuate movement of the mandrel into engagement with the post takes place immediately before the clip is pushed by the clip pusher across the mandrel and onto the post.

Referring to FIGURE 22, a pair of spring plates 399 are mounted by means of a block 403 on the frontal side of the frame plate 26 to the left, as viewed in the drawing, of the path of movement of the clip. These plates extend rightwardly on each side of the mandrel and are mounted on a level such that the mandrel is received between the divergently flared ends of the plates. The upper edges of these plates are also divergently flared so that as the clip pusher moves downwardly past the mandrel, these fingers will be pushed slightly apart by the clip pusher. The function of these plates is to act as a guide means or retainer when the wire is being connected to the B post for maintaining the portion of the wire 13 which is adjacent to the mandrel with its axis in alignment with the center of the sloping groove 404 of the mandrel, see FIGURE 28. It should be added that these spring plates have been omitted from FIGURES 26-29 in the interest of clarity.

As shown best in FIGURE 2, the rocker arms 332, 356 and 424 are biased in a counterclockwise direction by springs as indicated. The action of the cams 335, 360 and 426 is to raise these rocker arms against the normal biasing force of the springs. The rocker arm 276 (FIGURE 14) is also biased in a clockwise direction by a spring as indicated and the cam 282 swings this rocker arm in a counterclockwise direction about its pivotal axis 278. The rocker arm 232 is not spring biased but is always under the positive control of the cams 244 and 246.

FIGURES 33 and 34 describe the motion of the more important parts of the disclosed embodiment during a complete operating cycle involving the forming of an electrical connection between the end of the wire and an A post, the travel or movement of the applicator to a position above the B post, and the severing of the wire and connection of the cut end of the wire to the B post. The following description of the operating cycle can be read in conjunction with FIGURES 33 and 34.

It is assumed that the parts are in the positions of FIGURES 5 and 26 at the beginning of the cycle with the applicator positioned above the A post and with the end of the wire extending as shown in FIGURE 26 between the mandrel and the clip supporting projection 336 of the transfer device. The parts will occupy these positions upon arrival of the applicator 2 at the A post after the completion of the preceding wiring operation. Upon arrival of the applicator at a position in alignment with the A post, the solenoid 46 is energized upon a signal from the tape 21 to permit engagement of the single revolution clutch on the shaft 30 to rotate this shaft through a single revolution and to rotate the shaft 32 through one half of a revolution. Upon engagement of the clutch, the cam 96 moves relative to the cam follower 92 on the lever 86 thereby to deactivate the feed rolls 62, 64 while the end of the wire is being connected to the A post. During a very brief initial portion of the cycle the wire nozzle 102 will complete its shifting movement from the position of FIGURE 9 to the position of FIGURE 5 since this shifting motion was not entirely completed during the previous operating cycle. During this same initial portion of the cycle the clip pusher and the wire shear blade are swung by rotation of the shafts 206 and 262 until the pusher is in alignment with the mandrel and the shear blade is in alignment with the opening in the mandrel bar, this initial swinging of the pusher and the shear blade being effected by downward movement of the connecting rod 228. Thereafter, the shear blade is lowered by the cam 290 and the shaft 206 is pushed downwardly by the screw 290 which engages the circular portion 223 of the shaft 206. During this interval, while the clip pusher is being urged downwardly by the screw 290, the connecting rod 228 will be moved downwardly by the cam 244, however, little, if any, downward thrust is transmitted through the connecting rod during this interval for the reason that the spring 240 is relatively weak and easily compressed. The wire shear blade and the shaft 262 reach the limit of their downward travel after the shaft 30 has been rotated through an arc of about 140 degrees by the time the clip will have been pushed from the transfer device, past the wire, and partially over the mandrel. It should be mentioned that a relatively high downward push must be imparted to the clip while it is being pushed past the wire and over the mandrel since during this period, the clip compresses the insulation of the wire against the edges of the mandrel on each side of the tapered groove 404 and withdraws the metallic core of the wire from the severed section of insulation. The positive pushing effect of the screw 290 on the shaft 206 is required to develop this relatively high thrust.

After the shear blade reaches the limit of its downward stroke, it dwells during an interval of about 100 degrees of rotation of the shaft 30 and the clip pusher 200 is pushed further downwardly under the influence of the cam 244. If the clip is being applied to a terminal post upon which one or more clips have previously been positioned and to which wires have previously been connected, the clip will come to rest against a previously applied clip prior to the limit of downward movement of the connecting rod 228. Further downward movement of the connecting rod without downward movement of the clip and the clip pusher is accommodated by relative telescoping movement of the two parts of the connecting rod into each other and compression of the spring 240.

As indicated on the timing diagram, the mandrel is arcuately moved against the top of the terminal post at about the same time as the wire shear blade reaches the lower end of its stroke. The nozzle begins to shift from the A position (FIGURE 26) towards the neutral position while the clip is being pushed over the mandrel by the clip pusher and the nozzle completes its shift to the neutral position at about the same time as the clip is moved from the mandrel onto the terminal post. This shifting of the nozzle from the A position to the neutral position during movement of the clip over the mandrel is desirable for the reason that during this brief interval, the clip will be pressing against the wire with a relatively high force, a high pushing force being required at this time because the insulation is being severed on the edges of the mandrel on each side of the sloping groove and the wire is being withdrawn from the severed section of insulation and compressed against the surface of the mandrel. It is desirable then to avoid the imposition of any tensile stresses on the portion of the wire extending from the nozzle 102 to the insulation support 9 of the clip during this withdrawing and ironing interval. The movement of the nozzle has the effect of avoiding such stressing of the wire extending from the lower end of the clip since the nozzle follows the clip while the nozzle is being shifted. After the nozzle reaches the neutral position, the clip must move relatively further down the post towards the surface of the panelboard and during this interval the clip may, in pulling on the wire, withdraw more wire from the reel and through the guide tube. Since the rolls are separated at this time, this additional wire can be freely withdrawn from the reel. Also, the slight tensile load imposed on the wire by the clip as it moves downwardly on the post and draws wire from the supply reel is not objectionable during this final portion of the downward movement of the clip since the compressing of the wire will have been completed after the clip moves from the mandrel onto the terminal post.

The clip pusher is raised during an interval of rotation of the shaft 30 of about 45° and is simultaneously swung outwardly during the terminal portion of this interval. The clip pusher and clip shear blade dwell in their raised and swung out positions during the remainder of the single revolution of the shaft 30.

As is also apparent from the timing diagram, at the beginning of the cycle the transfer mechanism is at the clip loading station (FIGURE 22) and is shifted to a position in alignment with the clip pusher during an interval in the early part of the cycle. The shifting of the transfer device, in fact, overlaps the initial portion of the downward stroke of the clip pusher and the shear blade. The transfer mechanism dwells in the position of FIGURE 21 until the shaft 30 has been rotated through an angle of about 270° and is then shifted back to the clip loading station. The next adjacent clip on the strip is then fed onto the projection 336 during the final 45° of rotation of the shaft 30.

At the conclusion of a complete revolution of the shaft 30 and after the operations described above have been carried out, the wire nozzle will be in the position shown in FIGURE 6 and feeding of wire through the flexible guide tube 67 will commence. The applicator is now moved in accordance with directions supplied by the tape 21 to the motors which rotate the positioning screws 12 for the carriage to a position above the B post. Upon arrival of the carriage at the B post, the single revolution clutch is again engaged upon a signal from the tape, the shaft 30 is rotated through a complete revolution, and the shaft 32 is rotated through one half of a revolution. The movements of the clip pusher, the wire shear blade, the clip transfer mechanism and the mandrel are the same during this second revolution of the shaft 30 as during the first revolution. The wire nozzle however, is shifted during about the first 45° of this second revolution of shaft 30 to the position of FIGURE 9 and dwells in this position until the shaft 30 has been rotated through an angle of about 270°. Upon downward movement of the wire shear blade during this part of the cycle the wire extending from the nozzle, through the notch 416 and across the upper surface of the mandrel, is severed when the punch passes the edge 401. At the completion of the downward stroke of the clip pusher the cut end of the wire extending from the A post will then be connected to the B post. During the final 90° of rotation of the shaft 30 during this second portion of the cycle the nozzle is shifted towards the position of FIGURE 26 (the A position) but it does not arrive at this position until the commencement of the next operating cycle as noted on the timing diagram.

Advantageously, the motor 80 which drives the wire feed roll 62, 64 is of a variable speed type, its speed being controlled by the tape in a manner such that the speed of the carriage is maintained at the same level as the speed of wire feed. With this arrangement, the wire is projected downwardly through the nozzle and against the surface of the panelboard while the applicator is moving relatively over the panelboard and the precise amount of wire required to connect two terminal posts will be fed from the reel and automatically laid against the surface of the board. This feature of the invention avoids all necessity for separate measuring the dressing devices which have previously been used for laying the wire against the terminal board and in the aisles or between the rows of the terminal posts. In order to achieve this result, it is desirable that the lower end of the nozzle 102 be positioned relatively close to the surface of the board so that the emergent portion of the wire between the end of the nozzle and the surface of the board will remain substantially straight. In the disclosed embodiment the end of the nozzle is slightly below the upper ends of the terminal posts, an arrangement which assures laying of the wire in the desired aisles between the rows of terminal posts. However, it is possible to have the nozzle at a somewhat higher level under some circumstances; for example, where the wire is relatively stiff and would remain straight it was fed out of the nozzle.

FIGURE 11 illustrates the significance of the arrangement shown in FIGURE 7 of mounting the rod 104 (on which the nozzle is mounted) on the shaft 130 in a manner such that the shaft 130 moves leftwardly when the nozzle is shifted to its neutral position (FIGURE 6). As explained above, upon rotation of the hub until the nozzle is in this neutral postion, the V groove 142 of the hub is brought into alignment with the bevelled ends 140 of the fingers 138 and leftward movement of the shaft, and the nozzle 102 takes place under the influence of the spring 136. In FIGURE 11, the reference numeral 428 shows the position of the nozzle when an electrical connection is being made to an A post. It will be seen that the plane of the nozzle lies in a plane 430 occupied by a row of terminal posts. When the nozzle is shifted to the neutral position it is swung until its axis extends vertically as shown at 432 and it is then moved laterally of its axis by virtue of the movement of the shaft 130 until it occupies the position shown at 434. When the nozzle is in this position, it is free to move along any of the dotted line paths shown without colliding with a terminal post during movement. Oblique movement of the carriage and the nozzle must be at some predetermined angle which will avoid collision with the terminal posts. The precise angles or angle of oblique movement permitted will be dependent upon the dimensions of the posts and the grid spacings. Upon arrival of the nozzle at the B post, the shaft 130 and the hub 128 are rotated to position the nozzle in the orientation shown in FIGURE 9. Such rotation of the hub 128, causes the shaft to move axially against the biasing force of spring 136 so that the nozzle will be positioned in the plane 430 and will be properly located for the operations of cutting the wire and connecting the cut end of the B post (FIGURES 28 and 29).

As an alternative to the mechanical arrangement of the axially movable shaft 130 for effecting the lateral movement of the nozzle to the location 434 in FIGURE 11, the entire applicator or head 2 could be moved laterally a short distance by the screws 12 prior to the laying of the wire from the A post to the B post. Movement of the entire head or applicator in this manner would be controlled by a signal from the tape 21. The disclosed mechanical arrangement of effecting this lateral movement of the nozzle has the comparative advantage of avoiding the necessity of imparting information to the tape to control this motion of the nozzle. This lateral movement of the nozzle is required during each complete cycle of operation and for this reason is advantageously achieved automatically and mechanically as in the disclosed embodiment of the invention.

A significant feature of the disclosed embodiment is that the nozzle, as viewed in FIGURES 26 and 28, swings about the point 401 as a center. Shearing of the wire takes place in a plane in which the shear point 401 lies and the end of the nozzle in FIGURE 28 is located a distance from this shear plane such that the length of the wire which is emergent from the nozzle after shearing (FIGURE 29) is sufficient to reach from the end of the nozzle to the shear plane 401 when the nozzle is shifted back to the position of FIGURE 26 for the next succeeding operating cycle. This feature of the invention thus assures that the required length of wire will extend from the nozzle when the parts are in the positions of FIGURE 26 at the beginning of each complete operating cycle.

It should be added that the shear plane 401 includes the axis of the shaft 130 (see FIGURES 5 and 9) so that the nozzle in these figures is directed substantially towards the center of this shaft in both of these views. The slots 124 in the arms 126 are relatively wider at their extreme ends than they are in the vicinity of the hub 128. These slots 124 are made wider at their extreme ends in order to permit lateral movement of the ends 122 within the slots until the nozzle is directed towards the axis by the shaft 130, thus in FIGURE 5 the ears 122 are biased towards the lower sides of the slots 124 by the lever 144 while in FIGURE 9 the same lever 144 biases the ears 122 against the upper sides of the slots.

Referring to FIGURES 28 and 29, it can be seen that upon downward movement of the dressing frame 281, some wire will be withdrawn from the supply reel through the nozzle, this withdrawal of wire being possible since the feed rolls 62, 64 are separated when the parts are in the positions of FIGURE 28. The withdrawing of a small amount of wire by the dressing frame as it moves downwardly is desirable in that a slight excess of wire is provided in the lead extending from the A post to the B post after the clip on the B post has been pushed downwardly onto the terminal post. This slight excess of wire constitutes a "service loop" which permits subsequent removal of either one of the clips connecting the wire to the posts and reattachment of the wire to an adjacent post. The service loop thus permits the making of corrections or changes to the wiring panel of the panelboard after the wiring operation has been carried out.

Several modifications which might be employed will be apparent from the foregoing description. For example, in the disclosed embodiment the stroke of the clip pusher 200 is of fixed amplitude and where a second or a third clip is moved onto a single terminal post, the two sections of the connecting rod 228 move telescopically together after the clip has come to rest on the post. As previously explained, this arrangement prevents the imposition of unduly high stresses on the clips and prevents the second clip from being jammed against the first clip. As an alternative to this arrangement, it is feasible to prevent a variable stroke mechanism for the clip pusher 200 and to control the length of the stroke by means of the tape 20. With this arrangement, the clip pusher would be moved through a relatively long stroke during application of the first terminal clip to the post. Upon application of a second clip to the same terminal post, the clip pusher would be moved through a relatively shorter stroke by the tape controlled pusher mechanism so that the second clip would come to rest above the level of the first clip.

It is also practical to connect a single wire to three or more terminal posts, that is to connect the leading end of the wire to an A post, to connect the same wire at a point intermediate its ends to a B post, and to connect the remaining end of the wire to a C post. Connections of this sort can be achieved, for example, by slitting the insulation of the wire when the connection is made rather than completely removing it. One type of mandrel for slitting insulation is shown, for example, in U.S. application Serial Number 282,092, filed May 21, 1963, by Robert F. Cobaugh, for Apparatus For Making Electrical Connections. In order to lace a wire among three or more terminal posts in accordance with the present invention, the insulation would be slit when the connection is made and the wire shear 256 would not be activated after making the second connection (the connection with the B post). The applicator or head would then be moved to a position over the C post, if desired, the wire sheared while the electrical connection was being made to the C post.

While the specific form of the invention described in detail above and shown in the attached drawings is particularly intended to strip the insulation from the wire ends, it is also feasible to practice the invention with uninsulated wires and with wires having a varnish type insulation thereon such as polyvinyl formal resin (Formvar) insulations. Where the wire is provided with a varnish type insulation, it has been found that the insulation will often be removed to the extent necessary for making an electrical connection when the wire is dragged and ironed on the mandrel. If desired, the mandrel can be provided with an abrasive surface to facilitate the breaking of the film of varnish type insulation.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:

1. Apparatus for connecting conductor extending from a substantially endless source to at least two terminal posts by means of terminal clips having a web portion and having upstanding, post-embracing sidewalls on two opposite sides of said web, said clips being adapted to hold said conductor against the surface of said post, said apparatus comprising: means for positioning the leading end of said conductor adjacent to the end of a first post with its axis oriented transversely of the axis of said post, means for positioning a terminal clip in axial alignment with said post and oriented with respect to said conductor such that said leading end extends through the plane of the web of said clip, thence transversely of the axis of said post with the tip of said leading end disposed on the opposite side of said post from said web, means for moving said clip along a predetermined path onto said first terminal post whereby, said leading end is dragged by said clip over the surface of said post and electrically connected thereto, means for positioning a remote portion of said conductor which is between said leading end and said endless source adjacent to, and with its axis oriented transversely of the axis of, a second terminal post, means for positioning a second terminal clip in alignment with said second terminal post in an orientation such that said remote portion extends through the plane of said web, thence transversely of the axis of said post and thence to said source, and means for moving said second clip onto said second post whereby said remote portion is dragged by said clip over the surface of said second post and electrically connected thereto.

2. Apparatus as set forth in claim 1 including means for shearing said conductor at a location adjacent to said remote portion and between the plane of said web and said source.

3. Apparatus as set forth in claim 1 wherein said means for positioning the leading end of said conductor adjacent to the end of a first post and said means for positioning a remote portion of said conductor adjacent to a second post comprises a single guide means for said conductor, said guide means being shiftable between two positions on opposite sides of said predetermined path of movement of said clip.

4. Apparatus for connecting conductor extending from a substantially endless source to at least two terminal posts by means of terminal clips, each clip having a web portion and having upstanding, post-embracing sidewalls on two opposite sides of said web, said clips being adapted to hold said conductor against the surface of said post, said apparatus comprising: means for moving said clips individually from a starting point along a predetermined path onto a terminal post, a mandrel on said predetermined path, said mandrel having a cross section conforming to the internal cross section of said clips whereby said clips are internally supported during movement over said mandrel, means for positioning the leading end of said conductor extending from said source adjacent to the end of a first terminal post and extending through the plane occupied by the web of one of said clips, when moving along said path, and thence across said mandrel at a location between said starting point and the leading end of said mandrel with the tip of said leading end disposed on the opposite side of said post from said web whereby, said leading end is dragged over said mandrel and onto a first post upon movement of a first clip along said path, and means for positioning a remote portion of said conductor between said leading end and said source with its axis oriented transversely of said plane and with said remote portion extending across said mandrel thence to said source whereby, said remote portion is dragged over said mandrel and onto said post when a second clip is moved along said path.

5. Apparatus as set forth in claim 4 wherein said means for positioning said conductor in said first position and said means for positioning said conductor in said second position comprises a single guide means, said guide means being shiftable between two positions on opposite sides of said mandrel.

6. Apparatus as set forth in claim 4 including means for shearing said conductor at a location adjacent to said remote portion and between said plane and said source.

7. Apparatus for connecting conductor from a substantially endless source to each of two terminal posts by means of terminal clips, each clip having a web portion and having upstanding, post-embracing sidewalls on two opposite sides of said web, said clips being adapted to hold said conductor against the surface of said post, said apparatus comprising: means for moving said clips individually from a starting point along a predetermined path and onto a terminal post, a mandrel on said predetermined path, said mandrel having a cross section conforming to the internal cross section of said clips whereby said clips are internally supported during movement over said mandrel, conductor guide means for guiding conductor from said source to a position beside said path and adjacent to the leading end of said mandrel, said guide means being shiftable from a first position on one side of said path to a second position on the opposite side of said path, said conductor extending from said guide means through the plane occupied by the web of said clips thence across the leading end of said mandrel to its end when said guide means is in said first position whereby, the end of said conductor can be connected to a first post upon moving one of said clips along said path when said guide means is in said first position, said conductor extending through said plane thence across said leading end of said mandrel, through said guide means, and thence to said source when said guide means is in said second position whereby a portion of said conductor remote from said end is connected to a second post when a clip is moved along said path with said guide means in said second position.

8. Apparatus as set forth in claim 7 including means for shearing said conductor, when said guide means is in said second position, at a location between said mandrel and said guide means.

9. Apparatus as set forth in claim 7 including a shear blade movable along a shearing path which extends parallel to said predetermined path and between said mandrel and said guide means when said guide means is in said second position.

10. Apparatus for connecting conductor from a substantially endless source to each of at least two terminal posts by means of terminal clips, each clip having a web portion and having upstanding, post-embracing sidewalls on two opposite sides of said web, said clips being adapted to hold said conductor against a surface of said post with said conductor extending downwardly between said web and said surface and emerging from the end of said clip which is proximate to the base of said post, said apparatus comprising: a frame, a mandrel on said frame conforming to the internal cross section of said clips, means for positioning said frame adjacent to one of said terminal posts with said mandrel adjacent to, and in alignment with, said one post, means for moving said clips individually from a starting point along a predetermined path over said mandrel and onto said posts, means for delivering terminal clips individually to said starting point, guide means for guiding conductor from said source to a position in which said conductor extends transversely of said path between said mandrel and said starting point and through the plane of a clip moved along said path, and means for shifting said guide means from one side of said mandrel to the opposite side thereof whereby, the leading end of a conductor from said source is connected to a first terminal post when said guide means is on the same side of said path as the plane of a clip moved along said path and when said wire extends through said plane, transversely of said path, across said mandrel to its end, and a remote portion of said conductor between said leading end and said source can be connected to a second terminal post when said guide means is disposed on the opposite side of said path and said conductor extends through said plane, across said mandrel, through said guide means, and to said source.

11. Apparatus as set forth in claim 10 including means for shearing said conductor at a location adjacent to said mandrel and between said mandrel and said guide means when said guide means is disposed on said opposite side of said path.

12. Apparatus for connecting wire extending from a substantially endless source to at least two terminal posts by means of open sided clips having a web and having upstanding sidewalls on two opposite sides of said web, said posts being mounted on a panel having a plurality of posts thereon, said apparatus comprising: clip moving means for moving said clips individually from a starting point along a predetermined path, an anvil on said path, said anvil having a cross section conforming to the internal cross section of said clips whereby said clips move over said anvil, wire guiding means for guiding wire from said source, said wire guiding means being normally disposed in a first position on one side of said path in which the end of a wire extending from said guide means is oriented with its axis extending through the plane of the web of a clip moving along said path and across the leading end of said mandrel, and thence to its end whereby, upon movement of a first clip along said path and onto a first terminal post, said end is dragged over said mandrel and held against said post, said guide means being shiftable to an intermediate position in which wire extending from said guide means extends beside said one side of said path and substantially normally towards said panelboard, means for moving said apparatus to a position adjacent to a second terminal post while said guide means is in said intermediate position, means for feeding wire from said source while said apparatus is moving whereby wire is laid from said first post to said second post, and means for shifting said guide means to a second position on the opposite side of said path in which a remote section of said wire is oriented with its axis extending through said plane of said web, across said leading end of said mandrel, thence through said guide means of said source whereby, upon movement of a second terminal clip along said path, said remote portion is dragged over said mandrel and connected to said second post.

13. Apparatus for connecting a wire to each of two terminal posts by means of open-sided clips having a web and having upstanding sidewalls on two opposite sides of said web, each of said clips being adapted to be axially moved along a predetermined path past a conductor disposed with its axis extending transversely of the plane of said web and telescopically onto one of said posts whereby said clip drags said wire over said post and holds said wire against said post after coming to rest thereon, said apparatus comprising: means for moving said clips individually along said predetermined path, wire guiding means for guiding wire from a substantially endless source, said wire guiding means having an outlet beyond which said wire is not supported, said outlet being disposed adjacent to said path and being shiftable from a first position, in which a leading end portion of wire of predetermined length extending from said outlet extends transversely of said path and through the plane of said web from one side of said path, to a second position in which wire extending from said outlet extends transversely of said path and through the plane of said web from the opposite side of said path whereby, the leading end of a wire from said source can be connected to a first terminal post when said outlet is in said first position, and said wire can be connected to a second terminal post when said outlet is in said second position, and shearing means for shearing said wire when said guide means is in said second position, said shearing means being equidistant from said first position and said second position of said guide means whereby, upon actuation of said shearing means when said guide means is in said second position, the amount of unsupported wire extending from said guide means is equal to said predetermined length leading end portion.

References Cited by the Examiner
UNITED STATES PATENTS

| | | | |
|---|---|---|---|
| 2,545,756 | 3/51 | Andren | 153—1 |
| 2,958,926 | 11/60 | Morison | 29—155.5 |
| 2,978,800 | 4/61 | Blain | 29—203 |
| 3,023,789 | 3/62 | Bonhomme | 140—93 |
| 3,037,269 | 6/62 | Barkstrom et al. | 29—203 |
| 3,065,524 | 11/62 | Donnell et al. | 29—155.5 |

WHITMORE A. WILTZ, *Primary Examiner.*
THOMAS H. EAGER, *Examiner.*